US011461738B2

(12) United States Patent
Rachal et al.

(10) Patent No.: US 11,461,738 B2
(45) Date of Patent: *Oct. 4, 2022

(54) SYSTEM AND METHODS FOR IMPROVED EMAIL SECURITY BY LINKING CUSTOMER DOMAINS TO OUTBOUND SOURCES

(71) Applicant: MxToolbox, Inc., Austin, TX (US)

(72) Inventors: Eric Rachal, Austin, TX (US); Peter LeBlond, Cedar Park, TX (US); Austin Ewing, Austin, TX (US); Jeremy Barnes, Austin, TX (US); Roberto Ornelas Mendez, Austin, TX (US)

(73) Assignee: MxToolbox, Inc., Austin, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/098,086

(22) Filed: Nov. 13, 2020

(65) Prior Publication Data

US 2021/0065125 A1    Mar. 4, 2021

Related U.S. Application Data

(63) Continuation of application No. 16/221,282, filed on Dec. 14, 2018, now Pat. No. 10,839,353.

(60) Provisional application No. 62/676,121, filed on May 24, 2018.

(51) Int. Cl.
| G06F 15/16 | (2006.01) |
| G06Q 10/10 | (2012.01) |
| H04L 9/40 | (2022.01) |
| H04L 51/42 | (2022.01) |

(52) U.S. Cl.
CPC .......... *G06Q 10/107* (2013.01); *H04L 51/42* (2022.05); *H04L 63/0236* (2013.01); *H04L 63/1483* (2013.01)

(58) Field of Classification Search
None
See application file for complete search history.

(56) References Cited

U.S. PATENT DOCUMENTS

| 7,472,163 | B1 | 12/2008 | Ben-Yoseph et al. |
| 7,580,981 | B1 | 8/2009 | Golub |
| 7,580,982 | B2 | 8/2009 | Owen et al. |
| 8,307,038 | B2 * | 11/2012 | Gillum ................ G06Q 10/107 |
| | | | 709/206 |

(Continued)

OTHER PUBLICATIONS

Google Patents (Year 2020)**.
NPL IP.com (Year 2020)**.

*Primary Examiner* — Razu A Miah
(74) *Attorney, Agent, or Firm* — Michael Best & Friedrich LLP

(57) ABSTRACT

A method includes receiving, in a computer including a processor and memory, message reporting data indicating source addresses associated with email messages received by at least one receiving organization. Each source address specifies a sender of a selected one of the email messages. In the computer, outbound providers associated with the source addresses are identified. In the computer, the source addresses are classified based on the identified outbound providers. In the computer, the source addresses are aggregated based on the classification. In the computer, a report is generated including the aggregated source addresses.

20 Claims, 23 Drawing Sheets

(56) References Cited

U.S. PATENT DOCUMENTS

| | | |
|---|---|---|
| 8,938,508 B1 * | 1/2015 | McCorkendale ....... H04L 51/12 |
| | | 705/14.1 |
| 2002/0124052 A1 | 9/2002 | Brown et al. |
| 2005/0210116 A1 | 9/2005 | Samson |
| 2005/0240617 A1 | 10/2005 | Lund et al. |
| 2005/0249225 A1 | 11/2005 | Singhal |
| 2006/0075052 A1 | 4/2006 | Oostendorp |
| 2007/0005702 A1 | 1/2007 | Tokuda et al. |
| 2007/0079379 A1 * | 4/2007 | Sprosts ................... H04L 51/34 |
| | | 726/24 |
| 2007/0226297 A1 | 9/2007 | Dayan et al. |
| 2008/0208980 A1 | 8/2008 | Champan et al. |
| 2009/0013050 A1 | 1/2009 | Giunta |
| 2009/0313333 A1 | 12/2009 | Fanebost et al. |
| 2010/0161748 A1 | 6/2010 | Kojima et al. |
| 2010/0211641 A1 | 8/2010 | Yih et al. |
| 2011/0004919 A1 | 1/2011 | Chawla et al. |
| 2011/0067102 A1 | 3/2011 | Fukasawa et al. |
| 2013/0191474 A1 | 7/2013 | Goel et al. |
| 2013/0227016 A1 | 8/2013 | Risher et al. |
| 2015/0254566 A1 | 9/2015 | Chandramouli et al. |
| 2016/0006749 A1 * | 1/2016 | Cohen ................. H04L 63/1408 |
| | | 726/23 |
| 2016/0112356 A1 | 4/2016 | Zheng et al. |
| 2018/0012184 A1 * | 1/2018 | Shraim ............... H04L 63/1491 |
| 2018/0219818 A1 | 8/2018 | Kramer et al. |

* cited by examiner

190 ─

| id | startIpNum | endIpNum | prefixLength | ProviderID |
|---|---|---|---|---|
| 1 | 1089052672 | 1089060863 | 19 | 1 |
| 2 | 1113980928 | 1113985023 | 20 | 1 |
| 3 | 1123635200 | 1123639295 | 20 | 1 |
| 4 | 1208926208 | 1208942591 | 18 | 1 |
| 5 | 1249705984 | 1249771519 | 16 | 1 |
| 6 | 1823541248 | 1823543295 | 21 | 1 |
| 7 | 2915172352 | 2915237887 | 16 | 1 |
| 8 | 3512041472 | 3512074239 | 17 | 1 |
| 9 | 3627728896 | 3627737087 | 19 | 1 |
| 10 | 3639549952 | 3639558143 | 19 | 1 |
| 11 | 2899902464 | 2899910655 | 19 | 1 |
| 12 | 2899910656 | 2899914751 | 20 | 1 |
| 13 | 2899935232 | 2899943423 | 19 | 1 |
| 14 | 2899943424 | 2899947519 | 20 | 1 |
| 15 | 2899951616 | 2899959807 | 19 | 1 |
| 16 | 1823563776 | 1823571967 | 19 | 1 |
| 17 | 3475923968 | 3475924223 | 24 | 2 |
| 18 | 3475940096 | 3475940351 | 24 | 2 |
| 19 | 1094166784 | 1094167039 | 24 | 2 |
| 20 | 2637721088 | 2637721599 | 23 | 2 |

180 ─

| ID | Identifier | OutboundEmailProviderId |
|---|---|---|
| 1 | spf.google.com | 1 |
| 2 | _netblocks.google.com | 1 |
| 3 | _netblocks2.google.com | 1 |
| 4 | _netblocks3.google.com | 1 |
| 5 | spf.protection.outlook.com | 2 |
| 6 | spfa.protection.outlook.com | 2 |
| 7 | spfb.protection.outlook.com | 2 |

Mx Toolbox Admin   Hive   Users▼   Abuse▼   Monitoring▼   Global▼   Dev▼   Visibility   [IP, God, or User Search]    Public Site   Service Box   Rev: 1382018   Dark

Outbound Email Providers

Filter [ ]     Provider Count 2532 | Total Domains: 3589

| Public Name | Domains | Default Category | Private? | Preserves DKIM | Website | Confirmed | DKIM Via | DKIM Allows Custom Record | DKIM Has Signing Support | DKIM Setup Process | SPF Via | SPF Allows Custom Bounce Back |
|---|---|---|---|---|---|---|---|---|---|---|---|---|
| Office365 | 2459 | Forwarder ▾ | No ▾ | No ▾ | www.outlook.com | Yes ▾ | CNAME Record ▾ | No ▾ | Yes ▾ | Self Service Console ▾ | include ▾ | No ▾ |

Key (outlook)

[Close] [Save]   Dkim Support Link [ https://technet.microsoft.com/en-us/library/mc595945(v=exchg.150).aspx ]
Custom Section

Identifiers
- ☑ spfcosi.outlook.com
- ☑ spfprotection.outlook.com
- ☑ proingxs-n_mat.protection.outlook.com
- ☑ prod.outlook.com
- ☑ spf.protection.outlook.comv-spf1
- ☑ spf.protection.outlook.de
- ☑ spf-b.outlook.com
- ☑ spfo.protection.outlook.com

Spf Support Link [ https://technet.microsoft.com/en-us/library/dn789058(v=exchg.150).aspx ]

- ☑ spf.protection.partner.outlook.com
- ☑ eers-ca.matt.protection.outlook.com
- ☑ hotmail.com olc.protection.outlook.com
- ☑ xxxxxxxxsoftware-com.mail.protection.outlook.com
- ☑ spf.outlook.com
- ☑ spf-a.outlook.com
- ☑ spfa.protection.outlook.com

| Public Name | Domains | Default Category | Private? | Preserves DKIM | Website | Confirmed | DKIM Via | DKIM Allows Custom Record | DKIM Has Signing Support | DKIM Setup Process | SPF Via | SPF Allows Custom Bounce Back |
|---|---|---|---|---|---|---|---|---|---|---|---|---|
| Google GSuite (google) | 1654 | Forwarder | false | false | www.google.com | true | TXT | true | true | Self Service Console | include | false |
| MaxCmmp (mcsv) | 748 | Forwarder | false | false | www.mcsv.net | true | CNAME | false | true | Self Service Console | include | |
| SendGod (sendgod) | 448 | Forwarder | false | false | www.sendgod.net | true | CNAME | false | true | Self Service Console | include CR CNAME | |
| Zoho (zoho) | 406 | Forwarder | false | false | www.zoho.net | true | TXT | true | true | Self Service Console | include | false |
| xxxXxx | 374 | Forwarder | false | false | www.xxxxxxxxx.xxx | true | TXT | | | Self Service Console | include | |
| Mangun (mangun) | 368 | Forwarder | false | false | www.mangun.org | true | TXT | true | true | Self Service Console | include | true |
| HostGxxx (websitewelcome) | 304 | Forwarder | false | false | www.websitewelcome.com | true | TXT | true | true | Self Service Console | include | true |
| Amazong (amazonses) | 255 | Forwarder | false | false | www.amazonses.com | true | CNAME | | true | Self Service Console | include | false |
| Minecast (minecast) | 227 | Forwarder | false | false | www.minecast.com | true | | | true | Self Service Console | include | false |
| ZenDesk (zendesk) | 196 | Forwarder | false | false | www.zendesk.com | true | CNAME | false | true | Self Service Console | include | false |
| GoDaddy (secureserver) | 173 | Forwarder | false | false | www.secureserver.net | true | | | | Self Service Console | include | false |
| Salesforce (salesforce) | 134 | Forwarder | false | false | www.salesforce.com | true | TXT | true | true | Self Service Console | include | false |

FIG. 4
(Continued)

| MAILCHIMP - Outbound Email Source | Category: | FORWARDER | | | NOTES HERE | | | |
|---|---|---|---|---|---|---|---|---|
| ASSIGNED RANGES | | | | | | | | |
| Assigned Ranges (512 IPs) | | Overlapping Ranges (16M IPs) | Overlapping Source Name | Added on | Categorized As | By | Comment | Reviewed On |
| 1.1.1.0/24 (255 ips) | Remove Range | 1.1.0.0/16 (16K ips) | User Submitted Threat - Edit | 5/1/2018 | THREAT | brian@mxtoolbox.com | is total asshat | 5/2/2018 |
| | Remove Range | 1.0.0.0/8 | Incorrect Provider - Edit | 6/1/2018 | FORWARDER | austin@mxtoolbox.com | | Review Now |
| 2.2.2.0/24 (255 ips) | Remove Range | None | | | | | | |
| | | | | | | | | ~460 |
| Add New Range Manually | | | | | | | | |
| SPF IDENTIFIERS | | | | | | | | |
| Identifier | | Specified Ranges (16K IPs) | | Added on | By | | | |
| a.mcsv.com | Remove Identifier | 1.1.1.0/24 (255 ips) | Add Range | 1/1/2018 | | | ~470 | |
| | | 3.3.0.0/16 (16K ips) | Add Range | 1/1/2018 | | | | |
| b.mcsv.com | Remove Identifier | 2.2.2.0/24 (255 ips) | Add Range | | | | | |
| Add New Identifier | | | | | | | | |
| USER SUBMITTED RENAME / RECATEGORIZE / NEW RANGES | | | | | | | | |
| Policy Domains (MxAdmin ONLY!) | Suggested Name | Suggested Category | Suggested Range | Suggested ON | By | | | |
| example.com | New Mail Chimp Name | THREAT | 4.4.4.4/24 | 1/1/2018 | ted@example.com | Accept | Reject | |
| abc.com | None | FORWARDER | None | 2/2/2018 | Jon@abc.com | Accept | Reject | ~480 |
| | | | | | | | | |
| DMARC Subscriptions (MxAdmin ONLY!) | | | | ~490 | | | | |
| Policy Domains (MxAdmin ONLY!) | | | | | | | | |
| mxtoolbox.com | | | | | | | | |
| mxtoolbox.com | | | | | | | | |

FIG. 5
(Continued)

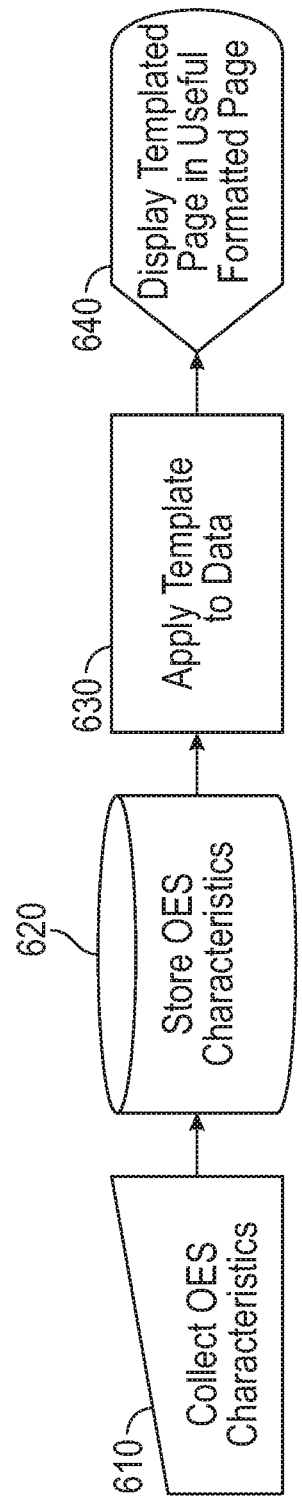

| Group | Asn Name | Reverse DNS | Outbound Email Provider Geo | Email Volume | DMARC Compliance pass | fail | rate | SPF Policy pass | DKIM Policy pass | Mx Rep | Blacklist |
|---|---|---|---|---|---|---|---|---|---|---|---|
| ▽ Verified (4) | | | | 497,594 82.15% | 497,054 | 540 | 99.89% | 99.70% | 83.75% | | |
| ⊕ ▸ Mailgun | | — | | 210,486 34.75% | 210,467 | 19 | 99.99% | 99.92% | 99.96% | 92 | — |
| ⊕ ▸ Mailgun | | — | | 205,601 33.94% | 205,592 | 9 | 100.00% | 99.93% | 99.97% | 100 | — |
| ⊕ ▸ MxIronPorts2 ✉ | | — | | 80,691 13.32% | 80,185 | 506 | 99.37% | 99.37% | 0.00% | 100 | — |
| ⊕ ▸ Google GSuite | | | | 816 0.13% | 810 | 6 | 99.26% | 12.99% | 99.26% | 90 | |
| Group Sub Data By: Sender's IP Addresses ▽ | | | | | | | | | | | |
| 209.85.218.72 | Google Inc. (15169) | mail-oi0-f72.google.com | US | 24 0.00% | 24 | 0 | 100.00% | 100.00% | 100.00% | 86 | Blacklisted - GSPAM, SORBS SPAM... |
| 209.85.218.71 | Google Inc. (15169) | mail-oi0-f71.google.com | US | 23 0.00% | 23 | 0 | 100.00% | 100.00% | 100.00% | 86 | Blacklisted - GSPAM, SORBS SPAM |
| 209.85.218.70 | Google Inc. (15169) | mail-oi0-f70.google.com | US | 23 0.00% | 23 | 0 | 100.00% | 100.00% | 100.00% | 88 | Blacklisted - SORBS SPAM, CASA... |
| 209.85.220.73 | Google Inc. (15169) | mail-sor-f73.google.com | US | 22 0.00% | 22 | 0 | 100.00% | 18.18% | 100.00% | 100 | No blacklists |
| 209.85.223.182 | Google Inc. (15169) | mail-io0-f182.google.com | US | 19 0.00% | 19 | 0 | 100.00% | 0.00% | 100.00% | 98 | Blacklisted - CASA CBL |
| 209.85.218.45 | Google Inc. (15169) | mail-oi0-f45.google.com | US | 16 0.00% | 16 | 0 | 100.00% | 0.00% | 100.00% | 90 | Blacklisted - SORBS SPAM, CASA... |
| 209.85.219.175 | Google Inc. (15169) | mail-yb1-f175.google.com | US | 16 0.00% | 16 | 0 | 100.00% | 0.00% | 100.00% | 90 | Blacklisted - SORBS SPAM, SORB... |
| 209.85.161.54 | Google Inc. (15169) | mail-yw1-f54.google.com | US | 14 0.00% | 14 | 0 | 100.00% | 7.14% | 100.00% | 92 | Blacklisted - SORBS SPAM |
| 209.85.214.52 | Google Inc. (15169) | mail-it0-f52.google.com | US | 14 0.00% | 14 | 0 | 100.00% | 0.00% | 100.00% | 88 | Blacklisted - SORBS SPAM, CASA... |
| 209.85.214.51 | Google Inc. (15169) | mail-it0-f51.google.com | US | 14 0.00% | 14 | 0 | 100.00% | 0.00% | 100.00% | 92 | Blacklisted - SORBS SPAM |
| more... | | | | | | | | | | | |
| ▷ Forwarder (235) | | | | 64,306 10.62% | 40,112 | 24,194 | 62.38% | 20.70% | 61.92% | | |
| ▽ Threat (2) | | | | 88 0.01% | 12 | 76 | 13.64% | 0.00% | 13.64% | | |
| ⊕ ▸ Spoofing Mx Toolbox ✉ | | — | | 66 0.01% | 1 | 65 | 1.62% | 0.00% | 1.62% | 99 | — |

FIG. 14
(Continued)

SYSTEM AND METHODS FOR IMPROVED EMAIL SECURITY BY LINKING CUSTOMER DOMAINS TO OUTBOUND SOURCES

CROSS-REFERENCE TO RELATED APPLICATIONS

This application claims the benefit of U.S. Provisional Patent Application No. 62/676,121, filed May 24, 2018, and U.S. patent application Ser. No. 16/221,282, filed Dec. 14, 2018, the entire content of each of which is hereby incorporated by reference.

TECHNICAL FIELD

The present invention relates to a specific improvement to the way computers operate with respect to electronic mail ("email") and in particular to systems and methods for improved email security by linking customer domains to outbound sources.

BACKGROUND

Domain-based Message Authentication Reporting and Conformance ("DMARC") allows email sending organizations to publish a method for email receiving organizations to provide reports on the sources of email it has received claiming to be from the sender. These reports provide information around Message volumes and the security features of the transmitted email messages. DMARC is built upon two other authentication protocols: Sender Policy Framework ("SPF") and DomainKeys Identified Mail ("DKIM").

In particular, the reports provide information on whether the messages align and authenticate for SPF and DKIM. Alignment refers to whether the sending organization's domain name matches the "friendly from" address the end user recipient sees in their email client. SPF authentication refers to whether or not the message was transmitted via an IP address published in the sender's SPF record. DKIM authentication refers to whether or not the message was cryptographically signed by the sender's private encryption key.

Finally, the reports contain information on what policy action the receiving organization took based on the alignment and authentication.

For example, whether or not the messages were quarantined or blocked:

```
<identifiers>
<header_from>example-2e1c371ce6f4.example-mail.com</header from>
<identifiers>
<auth_results>
<spf>
<domain>example.com</domain>
<result>permerror</result>
</spf>.
```

The General Problem

While there is much data contained in the DMARC reports, there is little directly actionable information. The data is aggregated by sending IP address, and a sending organization may have dozens of vendors that send legitimate email on their behalf. For example, they may use one hosting provider for their business email, another for marketing email campaigns, others for surveys, help desk system, project management systems, etc. Each of these vendors may have thousands of IP addresses from which they send mail.

To complicate things, end user recipients may forward mail from one inbox to another. This makes it appear in the DMARC reports that mail is originating from places other than their true source.

The solution is to be able to efficiently and automatically classify DMARC data into actionable next steps.

SUMMARY

Embodiments described herein provide methods and systems for processing message reporting data.

For example, one embodiment provides a method including receiving, in a computer including a processor and memory, message reporting data indicating source addresses associated with email messages received by at least one receiving organization. Each source address specifies a sender of a selected one of the email messages. In the computer, outbound providers associated with the source addresses are identified. In the computer, the source addresses are classified based on the identified outbound providers. In the computer, the source addresses are aggregated based on the classification. In the computer, a report is generated including the aggregated source addresses.

Another embodiment provides a system for processing message reporting data. The system includes a computer comprising a processor and memory. The computer is configured to receive message reporting data indicating source addresses associated with email messages received by at least one receiving organization. Each source address specifies a sender of a selected one of the email messages. The computer is further configured to identify outbound providers associated with the source addresses, classify the source addresses based on the identified outbound providers, aggregate the source addresses based on the classification, and generate a report including the aggregated source addresses.

Yet another embodiment provides a non-transitory computer-readable memory device with instructions stored thereon for processing message reporting data. The instructions, when executed, are configured to cause one or more computers to perform actions including receiving message reporting data indicating source addresses associated with email messages received by at least one receiving organization. Each source address specifies a sender of a selected one of the email messages. The actions further include identifying outbound providers associated with the source addresses, classifying the source addresses based on the identified outbound providers, aggregating the source addresses based on the classification, and generating a report including the aggregated source addresses.

Other features and aspects will become apparent by consideration of the following detailed description and accompanying drawings.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
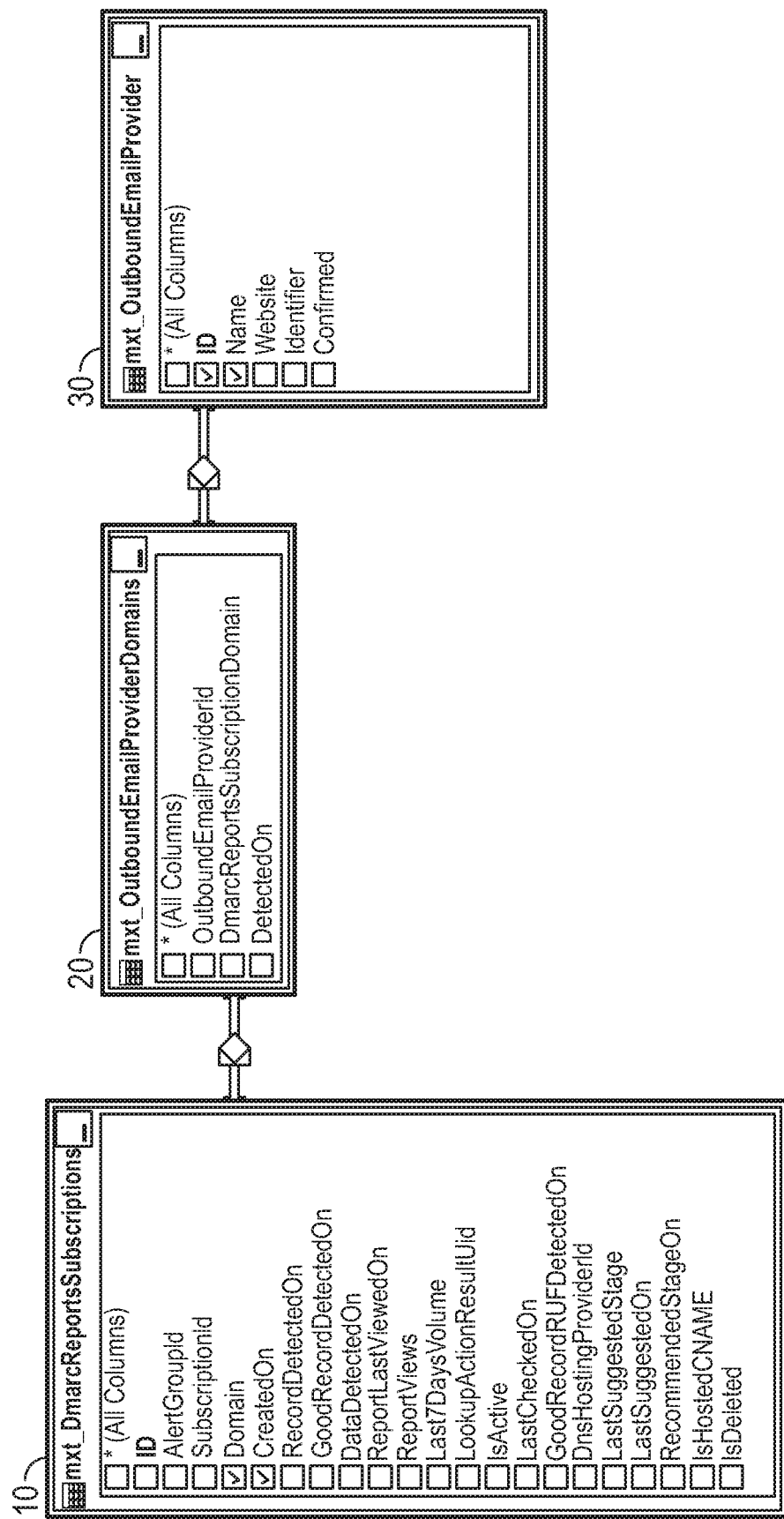
FIG. 1 is a database schema for linking customer domains to outbound sources.

The following discussion is directed to various embodiments of the invention. The term "invention" is not intended to refer to any particular embodiment or otherwise limit the scope of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Functionality described herein as being performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality (or portions thereof) by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In the following discussion and in the claims, the terms "including" and "comprising" are used in an open-ended fashion, and thus should be interpreted to mean "including, but not limited to." Also, the term "connect" or "connected" where used if at all is intended to mean either an indirect or direct connection. Thus, if a first component connects to a second component, that connection may be through a direct connection or through an indirect connection via other components and connections.

Certain terms are used throughout the following description and claims to refer to particular system components and method steps. As one skilled in the art will appreciate, different companies may refer to a component by different names. This document does not intend to distinguish between components that differ in name but not function.

1. A platform to collect, process, aggregate, display, and trigger/signal actions for DMARC report data to improve the way computers operate with respect to email.

(a) A DMARC report ingestion means to collect and process DMARC reports.

DMARC Reports contain data on email delivery to a particular mail system (e.g., Gmail®, Yahoo®). In order for that data to be useful, it must be collected, parsed, and stored in a database. Additional information is also appended to provide increased insight on mail delivery. Individual reports often do not provide insight and are difficult to read; therefore, the data needs to be aggregated and stored in a database so it can be manipulated.

Reports are received to an email box based on unique identification characteristics, so they can be sorted for the appropriate domain. The data for a domain is aggregated, and individual information fields are collated together to provide a picture of email delivery. As DMARC report data is collected, additional information is added by performing Geo, ASN, PTR, Blacklist checks, and composite Reputation ("Rep") scores and correlated to the DMARC report data, which helps users identify Outbound Email Sources and determine the extent of/reasons for problems.

DMARC report data is organized by Outbound Email Sources for a domain, which are determined by checking the SPF record for identifiers and cross referencing the IPs against IPs in the DMARC reports. Outbound Email Sources are also generated via user submissions that create OES unique to a singular domain's reports that can be analyzed for publication as a global OES. Those sources are classified as Verified (legitimized senders), Forwarders (known/trusted Outbound Email Sources that have sent email for the domain, but are not verified senders), Uncategorized, and Threats (known) DMARC Report data is additionally stored and organized by other signatures found in the individual reports such as Source IP Address, Return-Path/RFC5321.MailFrom domain, RFC5322. From domain, DKIM domain, and Email Authentication responses (SPF/DKIM) in order to provide additional details into email delivery. Aggregated DMARC Report data for each domain is additionally aggregated with other domains to generate global metrics.

Triggered actions are based on connecting stored and aggregated delivery errors from the DMARC report data with content to deliver corrections/recommendations to resolve errors. Actions are also generated through automatic comparative analysis of aggregated DMARC report metrics in a current period versus a prior period to identify and display anomalies and trends and significance.

Real-time metadata lookups (Geo, ASN, PTR, Blacklist).

Generate a Score based on aggregate blacklists perSource IP addresses.

Assign an Outbound Email Source to Source IP addresses.

Publicly assigned sources or Private sources that are domain specific.

Privately generated Outbound Email Sources are honored during processing.

Generate SPF identifiers tied to IP Ranges to find Outbound Email Sources and associate identifiers of Outbound Email Sources.

Aggregate data by source category (i.e., Verified, Threat, Unknown, Forwarder).

Categorizations can be overridden on a unique domain basis.

Verified sources must be domain specific and not globally applicable.

Aggregate data calculations by Outbound Source (i.e., DMARC, SPF, DKIM).

Aggregate and store 32 unique values (8×4 metrics) based on aggregate data per domain.

Identify anomalies based against a standard distribution.

Automatic verification of sources that elicit a match with the SPF record of the domain.

Aggregate all report data for all domains for evaluation of signatures/

(b) A database schema to store aggregated data from DMARC reports for a domain.

After the data is collected and aggregated, it must be stored in a format that can be easily converted to a visual display for the user. Some elements require multiple links across database tables, such as the SPF Provider Identifier being stored, and then linked to the IP Address/CIDR range for the identifier.

The schema must accommodate several different types of data from the reports and additional information included during the collection and processing of DMARC reports, and also must allow this information to be referenced, calculated, and retrieved quickly.

Aggregating 10 primary group values and sub aggregating by 10 group values.

Linking aggregate sources to forensic sources to find matches.

DMARC/SPF/DKIM Record lookup/evaluation and store configuration issues.

(c) A user interface that allows for end users to understand DMARC report data.

DMARC reporting and aggregation must be displayed to the user to allow them to make sense of the data and find actionable items to help them improve their delivery. Users are presented with the outbound email sources that have sent mail for the domain. They can view aggregated report data and additional information about the outbound email source and make changes to the classification, if necessary. Metadata, such as GeoLocation, ASN, PTR record, Blacklist, Composite Reputation Scores, and DMARC Forensic message samples are appended to the DMARC reports is also overlaid within the interface to help identification and classification of email sources along with reputation/blacklist information for additional delivery insights.

The user has sources verified through the SPF record added to their verified sources, while sources not verified but are known email providers are classified as forwarders (users forward messages to other email accounts, which changes the source of the sender). Threats are identified from a curated list of known offenders according to proprietary criteria. These threats are presented to the user, in addition to the verified and forwarder sources. Finally, any sources that cannot be fit into those groups are displayed as Uncategorized. Each source is also mapped to curated documentation about the source, their email capabilities, and relevant insights.

Systemwide sources from those stored are referred to as Public Sources. Users can classify uncategorized sources into new private sources or re-classify/re-name identified sources privately for their own account through the interface and in real-time transform these submissions and display them in their interface. This allows them to make changes when the public classification is not right for their own data. Users can also categorize public and private Outbound Email Sources as a threat source to display in their interface and additionally submit the threat for inclusion in a global threat signature list.

Additionally, the user is able to view and filter sub-data for each Outbound Email Source in order to access more granular metrics organized by signatures found in the DMARC reports such as Source IP Address, Return-Path/RFC5321.MailFrom domain, DKIM domain, etc. To aid in identification the interface also provides for the search and sorting of data to isolate sources for further evaluation.

Users are also guided to improve their DMARC record and security by adjusting their records through the interface. They are presented with their current settings and a value is suggested based on algorithms derived from their current DMARC record compliance. If a user has high compliance, they are directed to update their DMARC record to quarantine or reject, as well as the percentage of mail affected by this setting.

When users set up their domain, they are provided with the required RFC compliant record formats for publication of a DMARC record via TXT or CNAME format. In order to make this process easier for users they are directed to use a CNAME that points to a system of the platform that has a DMARC record for their domain. This allows them to make direct changes to their DNS setting without having to log in and change the value at their provider. A user not using the CNAME method would need to log in to their DNS provider and update their DNS record every time they want to make a change compared to simply adjusting a UI element in the Delivery Center of the platform provider.

The setup process also provides specific instructions for some providers on how to make the CNAME change, which includes specific steps for that designated provider's console instead of generic instructions. Users can also choose the old method and host their own DMARC record without the use of a CNAME.

Sources presented by Outbound Email Source/Category.

Status of DMARC policy in relation to aggregate reporting.

User ability to classify Outbound Email Sources for DMARC data.

User can generate new Outbound Email Sources and group IP addresses into them.

In real-time, transform private Outbound Email Source submissions into Outbound Email Sources for the specific domain.

Overlay the metadata (i.e., Geo, ASN, PTR, Blacklist, Rep, DMARC Forensic Samples) related to group by values.

Allow search/sort/filter function of report data and metadata to identify patterns, which can help a user group new sources.

Allow a user to generate a list of threat sources for additional outside activities.

Link sources to documentation (e.g., custom generated content), SPF/DKIM characteristics of 3rd-party senders, DNS Hosting providers/setup instructions, and DMARC record setup instructions.

View domains related to Source IP addresses.

Generates required RFC compliant DMARC records for publishing as TXT or CNAME DNS records at hosting provider.

Inspects existing records for translation to CNAME or TXT DNS records.

Allows users to publish changes to DMARC/SPF records directly through the interface (no interaction with hosting provider needed).

Engine/mechanism to elicit user to elevate security posture with DMARC policy and percentage mechanisms.

Ability to evaluate two (2) time series sets of performance data.

Ability to publish global threat list of sources and identifiers.

(d) Administration ability to review and manage Outbound Email Sources.

DMARC aggregate data is difficult for the layman to understand. Providing the Outbound Email Source to help them easily identify the system sending the mail requires accurate data. If you provide an incorrect source for an IP, then the user might mistake good senders for bad. In order to keep the data as accurate as possible, it needs to be curated.

Administrators require the ability to manage (add/edit/remove) IP Ranges, SPF Identifiers, and Source Category. Administrative tools must be able to present the relevant data for an outbound email source and allow manual changes to the data. Also, administrators need the ability to review private Outbound Email Source change submissions from users and approve or remove changes in order to maintain and improve public Outbound Email Source accuracy beyond manual curation methods.

In addition, there are data points that may possibly be categorized under multiple providers. Methods for detecting such data overlaps, and resolving them to provide accurate data to end users requires an administrative tool and detection algorithm. Displaying these ranges with user-based classifications, metadata, and additional data about the source allows administrative review on conflicts.

Ability to view and manage IP Ranges, SPF Identifiers, and Source Classification Category.

Display other Outbound Email Sources that overlap by IP Addresses (CIDR Format).

View private user submissions for IP Address/Category/OES Name changes and approve them for publication in public Outbound Source list.

Display all policy domains that are currently sending email via these Outbound Email Sources.

Interface to view all policy domains filtered by relevant DMARC action.

Interface to apply signatures/characteristics to Outbound Email Sources.

SPF method to identify, review, and publish new Outbound Email Sources.

(e) A method to automatically adjust DMARC and SPF records based on DMARC data.

(f) A method to elicit and generate threat sources and signatures.

2. A system to track, report, and alert blacklistings through DMARC report data and public/private/internal RBLs.

Blacklists are lists of IPs that use various criteria to identify IP addresses that have sent email considered to be spam, phishing attempts, or other email of malicious intent. As an organization's email platforms evolve, they often have multiple providers who, in turn, have large ranges of IPs that could potentially send email on the user's behalf. Users trying to monitor their email delivery have been forced to try to find ways to monitor the entirety of their provider's IPs.

Such monitoring would often be cost prohibitive and have limited usefulness. If you use a provider with 100,000 IPs and five (5) of them are listed but you have never sent email for those IPs, then knowing that they are blacklisted provides no practical usefulness.

A better solution is to identify Outbound Email Sources and the specific IPs which have actually sent mail through the use of DMARC reports and check the blacklist status of IPs that have actually sent email for the organization. This reduces the complexity of trying to monitor large IP ranges and multiple email platforms. Additionally, this method provides the benefit of coupling message volume sent for the IP address from the DMARC reports with a blacklist status and reputation score, thus providing a compelling means to assess the impact of the blacklisting(s) on email delivery as well as a means to prioritize triage of the blacklist issue.

Ingesting the DMARC reports provides the sending IP address. Then, using the platform provider's blacklist check ability through public DNS and private list queries to verify those IPs for listing status (and additional listing details) and presenting that to the user eliminates confusion about which IPs affect the user's actual email. In addition, the Reputation (Rep) score is displayed to the user to help determine the severity of their blacklist issue.

IT administrators will not need to spend their time troubleshooting issues for IPs that do not affect their email. They will also be able to provide specific information to support departments for their 3rd-party email platforms who often will not take any action on a blacklisting unless they know a specific instance of email being affected due to the blacklisting.

DMARC allows email sending organizations to publish a method for email receiving organizations to provide reports on the sources of email it has received claiming to be from the sender. These reports provide information around message volumes and the security features of the transmitted email messages.

In particular, they provide information on whether the messages align and authenticate for SPF and DKIM. Alignment refers to whether the sending organization's domain name matches the "friendly from" address the end user recipient sees in their email client. SPF authentication refers to whether or not the message was transmitted via an IP address published in the sender's SPF record. DKIM authentication refers to whether or not the message was cryptographically signed by the sender's private encryption key.

Finally, the reports contain information on what policy action the receiving organization took based on the alignment and authentication. For example, whether or not the messages were quarantined or blocked:

```
<identifiers>
<header_from>example-2e1c371ce6f4.example- mail.com</header_from>
</identifiers>
<auth_results>
<spf>
<domain>example.com</domain>
<result>permerror</result>
</spf>.
```

The General Problem

While there is much data contained in the DMARC reports, there is little directly actionable information. The data is aggregated by sending IP address, and a sending organization may have dozens of vendors that send legitimate email on their behalf. For example, they may use one hosting provider for their business email, another for marketing email campaigns, others for surveys, help desk system, project management systems, etc. Each of these vendors may have thousands of IP addresses from which they send mail.

To complicate things, end user recipients may forward mail from one inbox to another. This makes it appear in the DMARC reports that mail is originating from places other than their true source.

The solution is to be able to efficiently and automatically classify DMARC data into actionable next steps.

Turning now to the drawings, FIG. 1 shows screenshots from an exemplary database schema for linking customer domains to outbound sources. The schema includes DMARC Report Subscriptions 10; Outbound Email Provider Domains 20; and Outbound Email Provider 30, as described below.

Deliverability: Outbound Email Provider backend.

1. Method for discovering outbound email providers via SPF.

Figure 2:
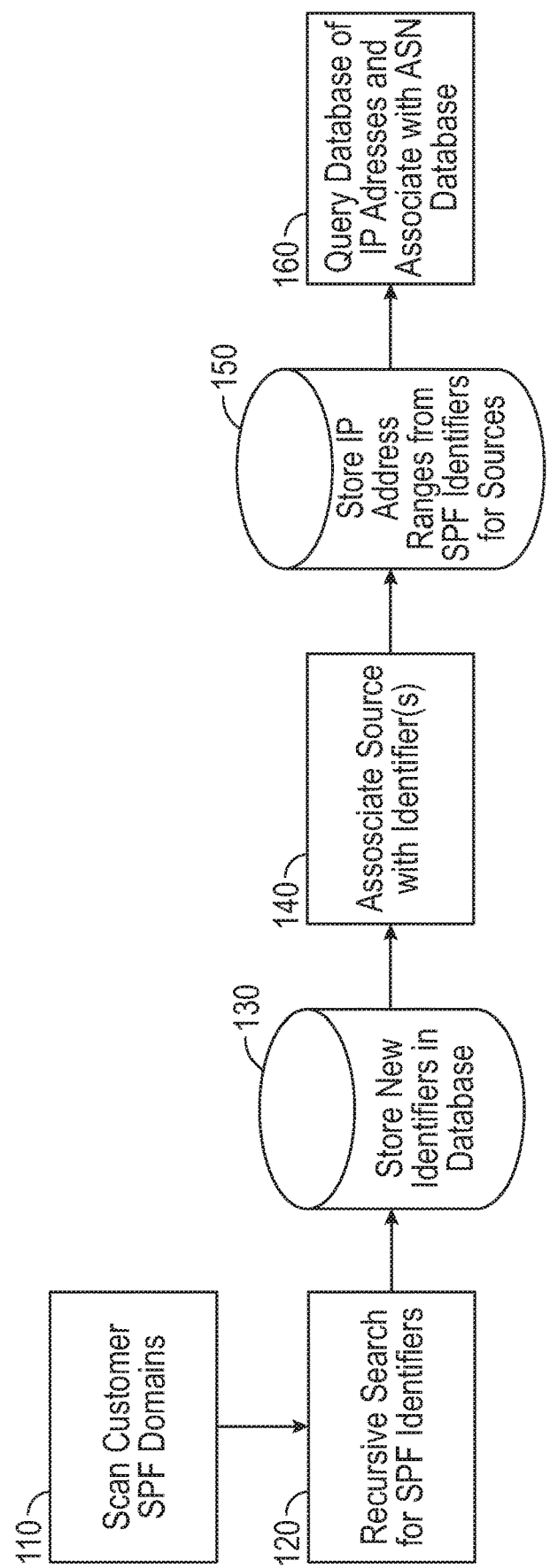
FIG. 2 is an outbound SPF provider data classification flow chart and provider tables.

FIG. 2 is a flow chart of an exemplary method for discovering outbound email providers via SPF and provider table. Step 110 is scan customer SPF Domains. Step 120 is a recursive search for SPF identifiers. New identifiers are stored in database 130. Step 140 is to associate Source with identifiers. Store IP address ranges from SPF identifiers for sources in database 150. Step 160 is to query database 150 and associate with ASN database.

Bootstrap Outbound Email Provider table.

SPF Outbound Provider Table 1.1 180/190.

Outbound SPF Provider Data classification.

Discovering outbound email sources from the SPF record requires several steps and sources of data and then referencing that data in order to make connections that allow the providers to be identified. Email is sent from IPs owned by the provider. The provider publishes an SPF record containing their range(s) of IPs. Searching a customer's SPF record for identifiers which are used in "include" statements, allows you to find the provider IPs. The IPs can be further identified by using ASN data.

Scan SPF DNS records for a large number of customer domains and recursively search for SPF include "identifiers."

When processing "Includes" for an SPF domain, IF the Identifier DOES NOT EXIST in the OutboundEmailProvider table, "Identifier" column, insert that include as a new row and follow that Include and insert IPs or Ranges for that include in the OutboundEmailRange table. Mark the "Confirmed" column in OutboundEmailRange as False.

All IPs found in SPF records for domain and trailing includes are inserted into SPF Origins.

Store newly found identifiers in a database with Confirmed Boolean set to false. If no outbound provider exists for that identifier, create a new outbound provider in the database.

For each new identifier, NOT associated with an existing outbound provider, create a new outbound provider with a unique ID in a database table and associate the relevant identifier.

For each recursive lookup that finds additional identifiers, new identifiers are stored as unique identifiers associated with the same outbound provider.

Each unique provider is assigned an ID.

Associate an outbound provider with one or more identifiers.

Store the IP address ranges described by the SPF identifiers in a database in such a way you can query by an IP address and get the associated outbound provider, with indexing to improve performance. ("Outbound IP Address Database")

When processing new domains for SPF identifiers, if the identifier already exists in the database, skip that identifier and continue processing.

Admin tool that provides ability to:

View and confirm all identifiers for each outbound provider.

View and confirm unique outbound providers.

Add/Remove identifiers between outbound providers.

Query a database of IP addresses associated with "Autonomous System Numbers" ("ASN Database") and store the associate of ASNs and outbound providers.

Where the "ASN Database" is derived from the Internet BPB routing table.

Repeating these steps on an interval to keep the data up to date.

Outbound Provider Identifiers.

Outbound Provider IP Address Database.

Figure 3:
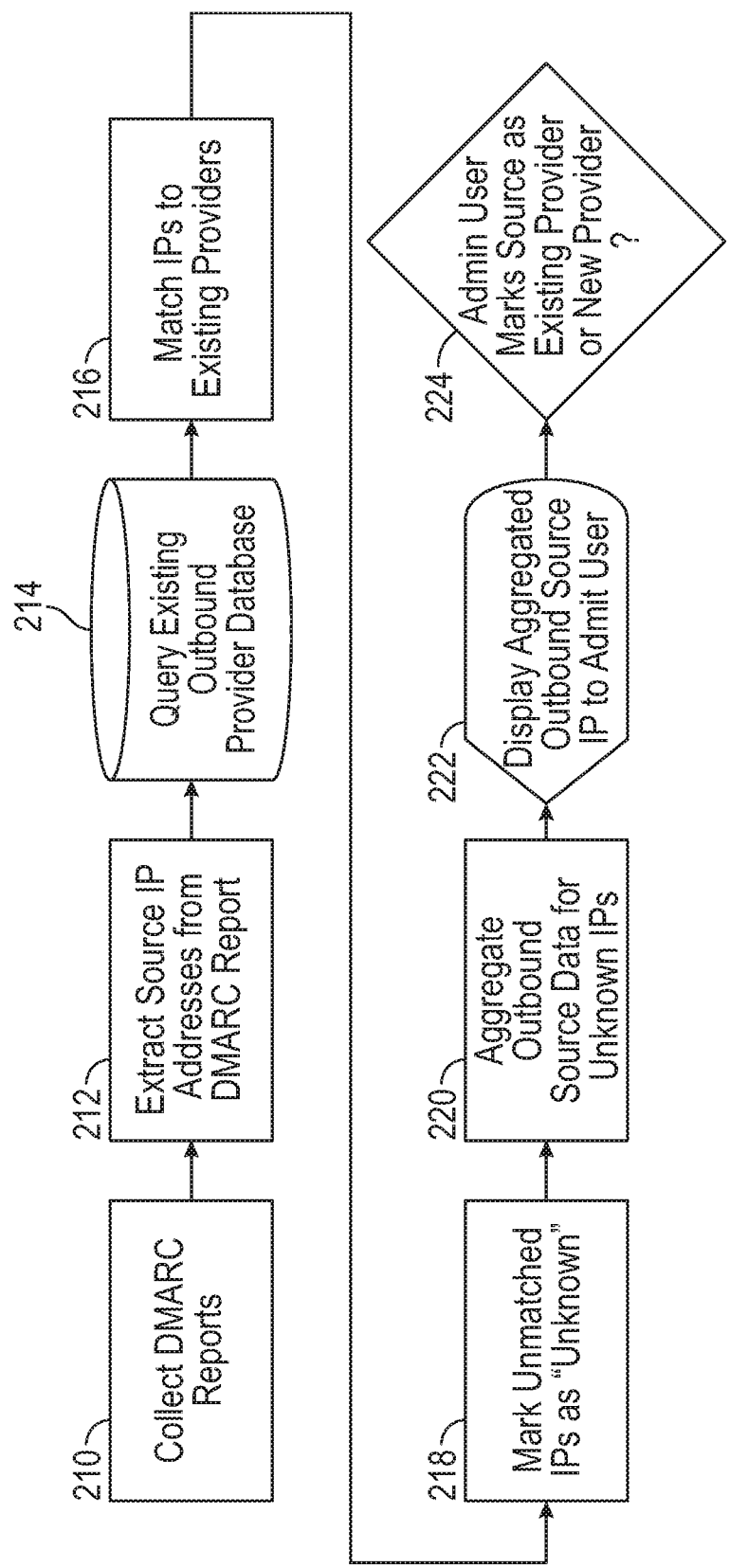
FIG. 3 is a flow chart for a method to discover outbound email providers via DMARC reports and table.

FIG. 3 is a flow chart and table for an exemplary method for discovering outbound email providers via DMARC reports.

Gather data for Active Mitigation product.

Receive DMARC reports for a large number of customer domains.

Collect and Store DMARC Reports in SQL 210;

Extract IP addresses from the reports and use the "Outbound Provider IP Address Database" to aggregate the IP addresses by previously discovered outbound providers 212;

Query existing outbound provider database 214;

Match IPs to existing providers 216; and

Assign the remaining IP addresses to an "unknown" category for further processing 218:

Attempt to match the outbound provider via ASN, PTR, Geolocation, Blacklist Status, Volume of DMARC compliant mail and number of domains that had mail sent from the IP.

Administrative Interface combining the processed data for the Source IPs.

List All IPs with ASN, PTR, Blacklist Status, Volume of DMARC compliant mail and number of domains that had mail sent from the IP.

Allow sorting by category.

Admin user can classify IP to an existing outbound source or create a new outbound source using aggregated data 220.

Display aggregated outbound source IP to admin user 222.

Admin user marks source as existing or new provider 224.

Administrative Tool for User Associations.

Confirm new OES providers first.

Outbound Provider Identifier/Name Confirmation.

Catalog Outbound Provider Characteristics.

SPF Outbound Provider Table 1.1 230.

Figure 4:
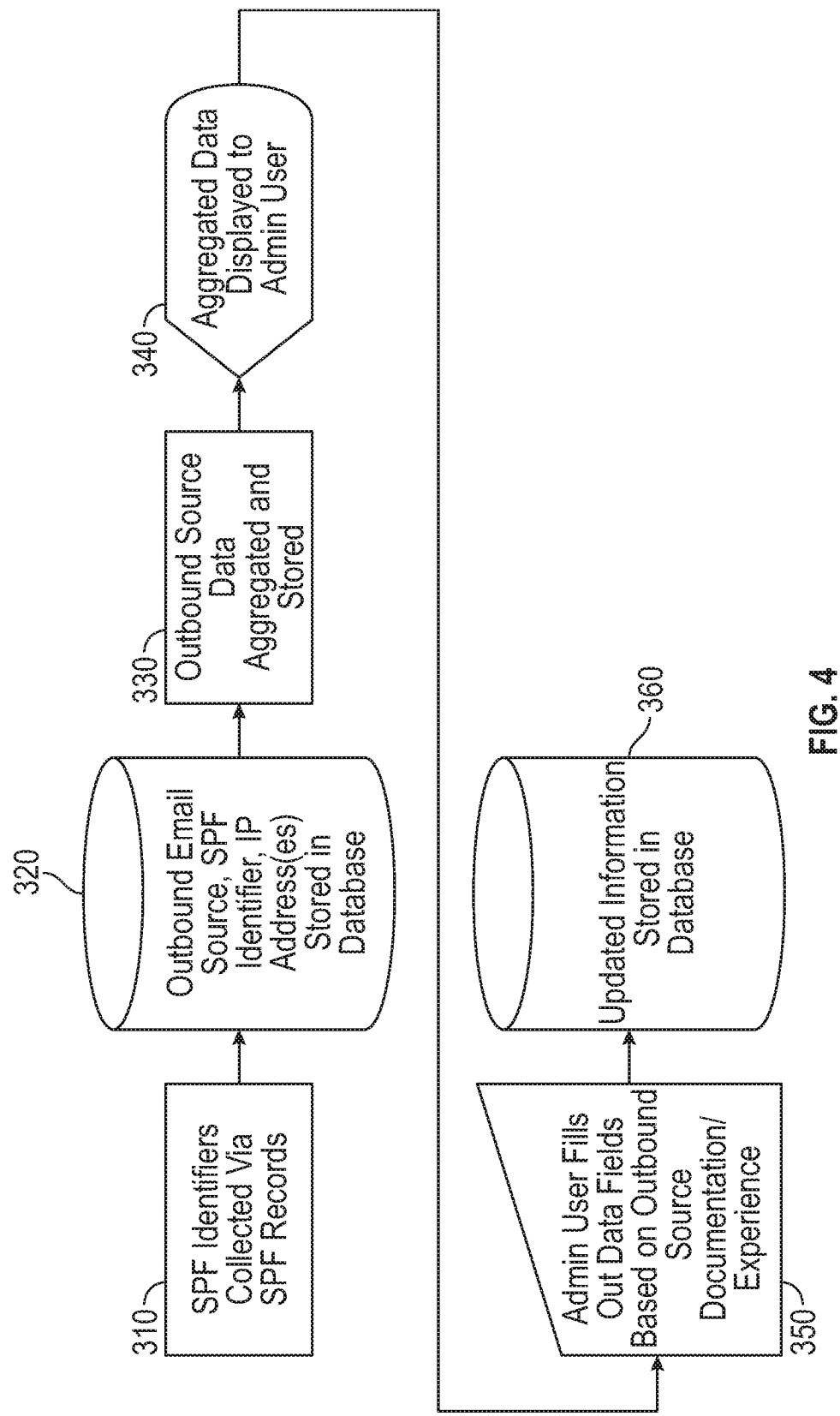
FIG. 4 is a flow chart of an exemplary user association administrative tool and table.

FIG. 4 is a flow chart for an exemplary administrative tool for user association to ensure that the data is accurate and can be changed or moved is necessary for the data to be useful for users trying to identify outbound sources.

1. Data collected via SPF records to take SPF Identifiers and associate them with a single outbound Provider 310.

2. Data aggregated and displayed to an administrative user to allow them to classify and confirm characteristics of the outbound provider 320 including:

A. Category (Verified Sender, Forwarder, Threat, Unknown);

B. Private Server;

C. Server Preserves DKIM record;

D. User Facing Website;

E. Manual Admin Confirmation;

F. DKIM done via CNAME or TXT Record;

G. DKIM Signing Support;

H. Outbound Source DKIM Setup Process (Self Service or By Request to Source Technical Support);

I. SPF Support via CNAME or INCLUDE;

J. Outbound Source SPF allows Customer Bounceback;

K. DKIM support link for Outbound Source;

L. SPF support link for Outbound Source; and

M. Associated Identifiers and Confirmation Status (Manual confirmation by admin).

Outbound source data aggregated and stored 330.

Aggregated data displayed to admin user 340.

Admin user fills out data fields based on outbound source documentation/experience 350.

Updated information stored in database 360.

3. Table 370 fields are editable via drop down, text field, or confirmation box so admins can update data.

Figure 5:
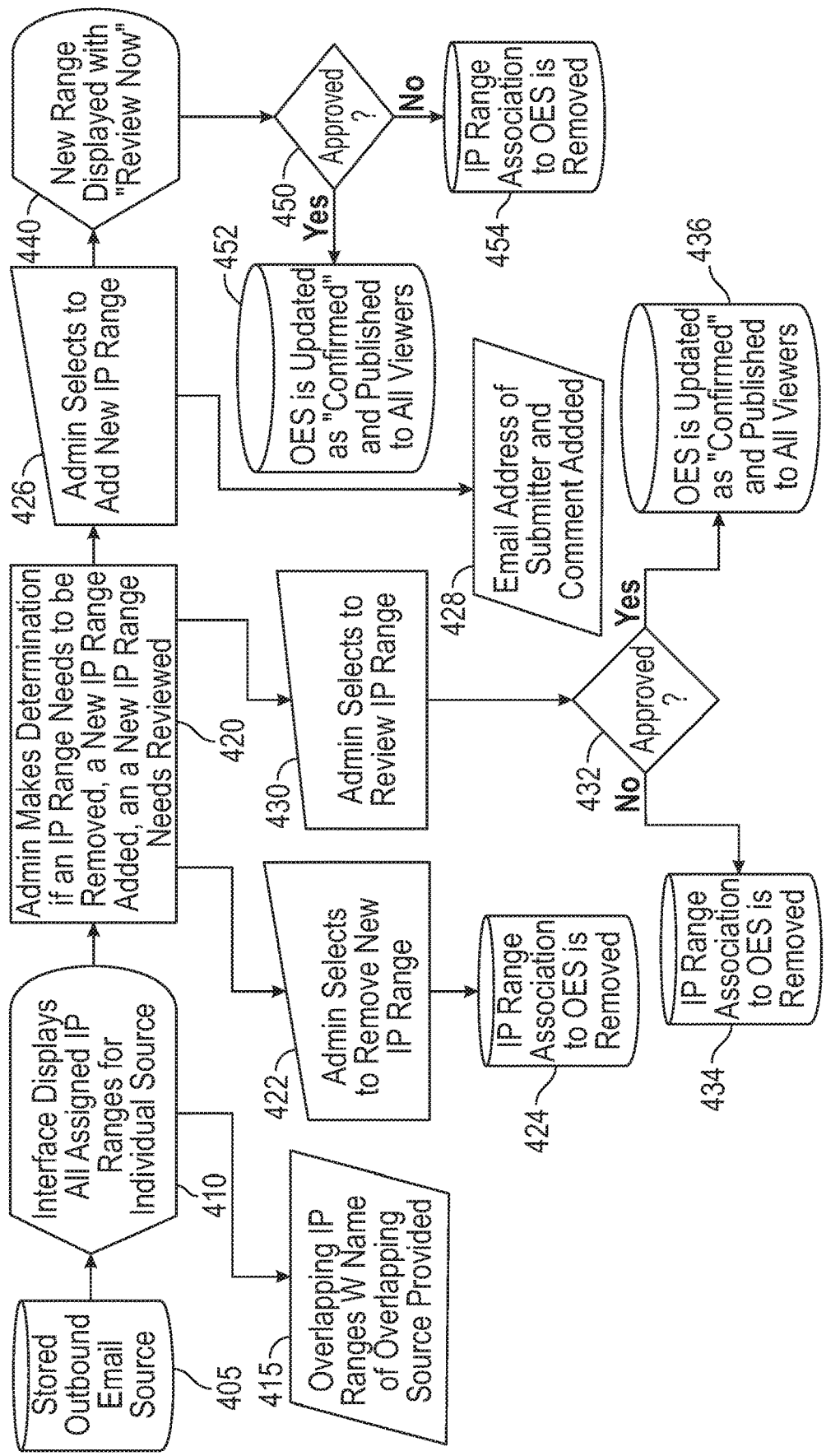
FIG. 5 is a flow chart of an exemplary method to manage outbound email source data and tables of exemplary sources.

FIG. 5 is a flow chart and table for an exemplary method to manage outbound email source data in database 405.

Admin Tool interface display 410 provides a view of an assigned IP ranges to an Outbound Email Source that has been confirmed and all of the associated data signatures that identify/confirm the IP ranges relationship to the OES.

Managing IP Addresses (CIDR format) assigned to the OES.

IP Addresses per provider are tied to additional characteristics/other Outbound Email Sources.

Each IP Address range is mapped 415 to any Overlapping CIDR range(s) (i.e., IP addresses within the CIDR range or larger ranges that include this range) and displayed for the Admin 420.

The overlapping CIDR range displays the Outbound Email Source name and Category that have been assigned to it. The overlapping CIDR range can be either a confirmed Outbound Email Source or a Outbound Email Source submitted by one or more users 428.

Tool provides method for admin to do the following:

Remove existing IP range 422, 424.

Add new IP range with all associated attributes 426.

Review submitted IP ranges 430.

Date and user who submitted IP range.

Approved? 432.

IP range association OES is removed 434.

OES is updated as "Confirmed" and published to all viewers 436.

New range displayed with "Review Now" 440.

Approved? 450.

OES is updated as "Confirmed" and published to all viewers 452 IP range association to OES is removed 454.

Figure 6:
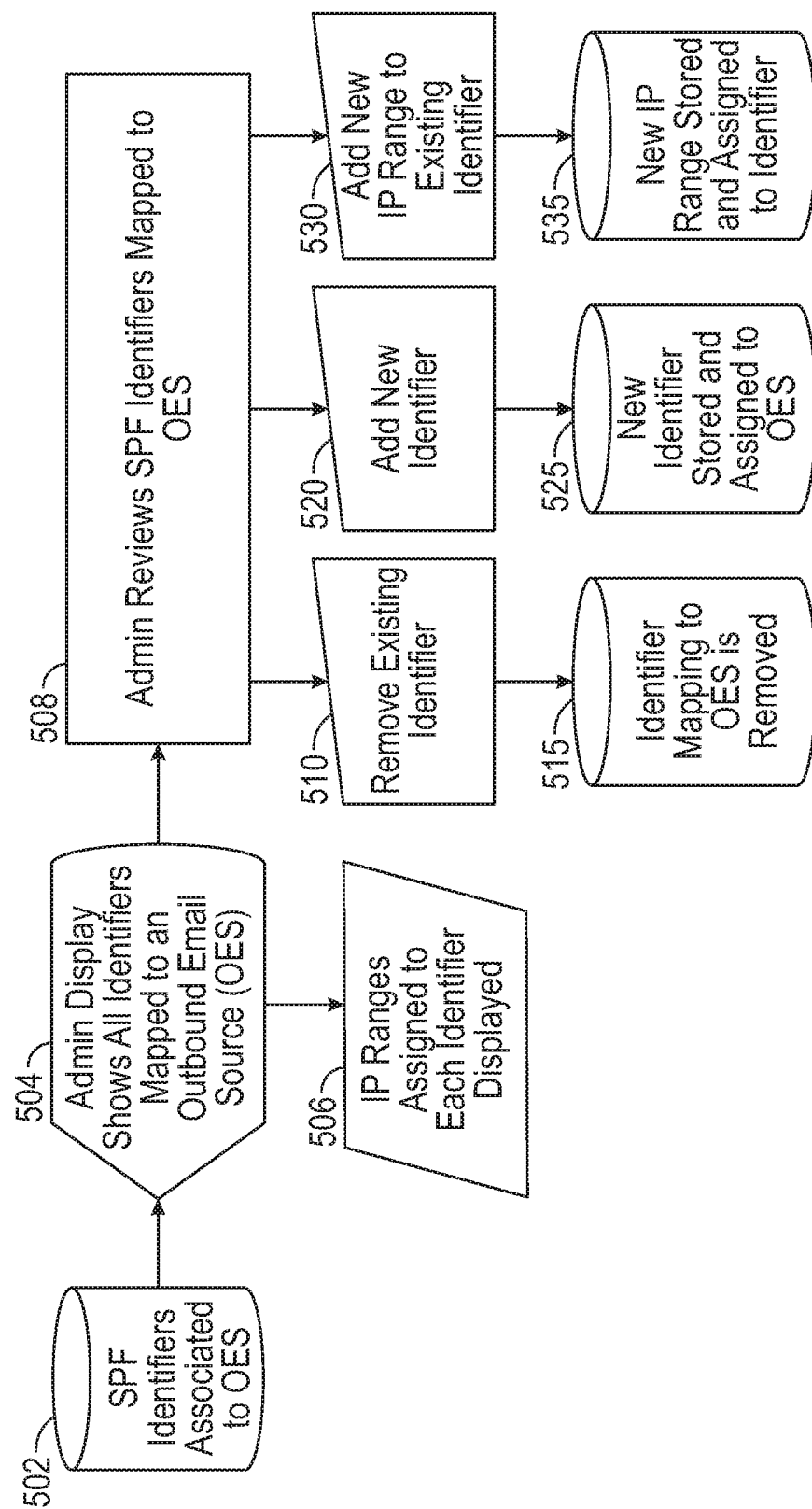
FIG. 6 is a step flow chart for an exemplary Administrative Tool.
Figure 6:
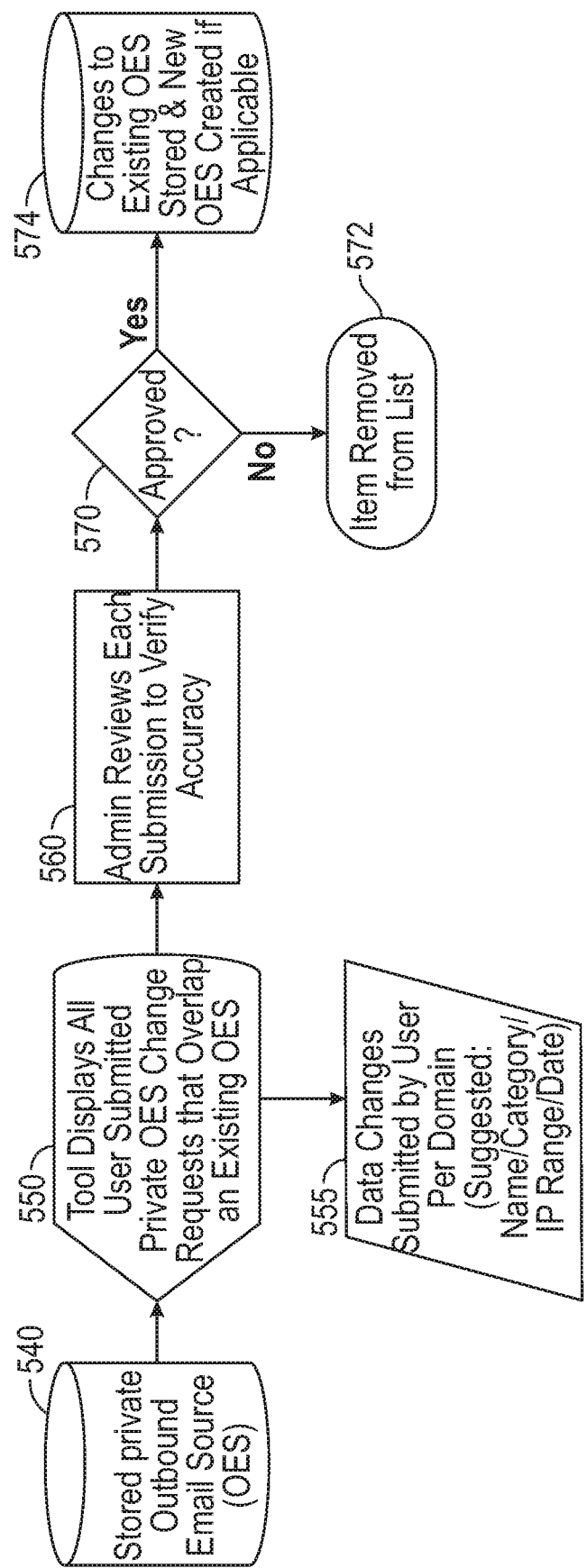

FIG. 6 is a step flow chart for an exemplary Administrative (Admin) Tool that provides a view of assigned SPF Identifiers associated with an Outbound Email Source.

SPF Identifiers associated to OES 502.

Admin Display shows all identifiers mapped to an Outbound Email Source (OES) 504.

IP Ranges assigned to each identifier displayed 506.

Admin reviews SPF identifiers mapped to OES 508.

Remove Existing Identifier 510.

Identifier mapping to OES is removed 515.

Add New Identifier 520.

New Identifier stored and assigned to OES 525. [00221] Add new IP Range to existing Identifier 530.

New IP Range stored and assigned to Identifier 535.

Store Private Outbound Email Sources (OES) 540.

Tool displays all user submitted private OES change requests that overlap an existing OES 550.

Data changes submitted by user per domain (Suggested: Name/Category/IP Range/Data) 555.

Admin reviews each submission to verify accuracy 560.

Approved? 570.

Item removed from list 572.

Changes to existing OES stored & new OES created if applicable 574.

SPF Identifiers are displayed in an Admin interface that allows an Admin to manage identifiers 504.

All known SPF identifiers assigned to an Outbound Email Source are displayed 506 along with:

Assigned IP Ranges (CIDR format);

Date identifier added to OES; and

Email of user who added Identifier.

Admin can:

Add new SPF Identifier to OES 520;

Remove an existing SPF Identifier from OES 510; and

Add a new IP Range (CIDR format) to any existing SPF Identifier 530, 535. Comments may be added.

Admin tool that provides a view of Classification Category (Verified Source, Forwarder, Active Threat, Mitigated Threat, Unknown) for an Outbound Email Source.

Tool allows Admin to modify Classification category of an OES and apply notes to the OES for Admin use.

Admin Tool that provides the ability for Admins to review and take action on user submitted Outbound Email Sources.

Admin tool displays list of all user (non-Admin) submitted changes for the specified OES based on private OES submissions.

Each list item is associated with the submitter's domain or subdomain.

List displays suggested changes submitted by the user in the below areas:

Suggested Name: New or Existing OES name;

Suggested Category;

Suggested IP Range (CIDR format); and

Suggested On Date.

DMAC Subscriptions are visible to admin user.

Admin tool provides mechanism for Accepting or Rejecting the submitted change.

Accepted submissions are applied and stored in the OES table for global application.

Rejected submissions are removed from list and remain unchanged in Private OES table.

Figure 7:
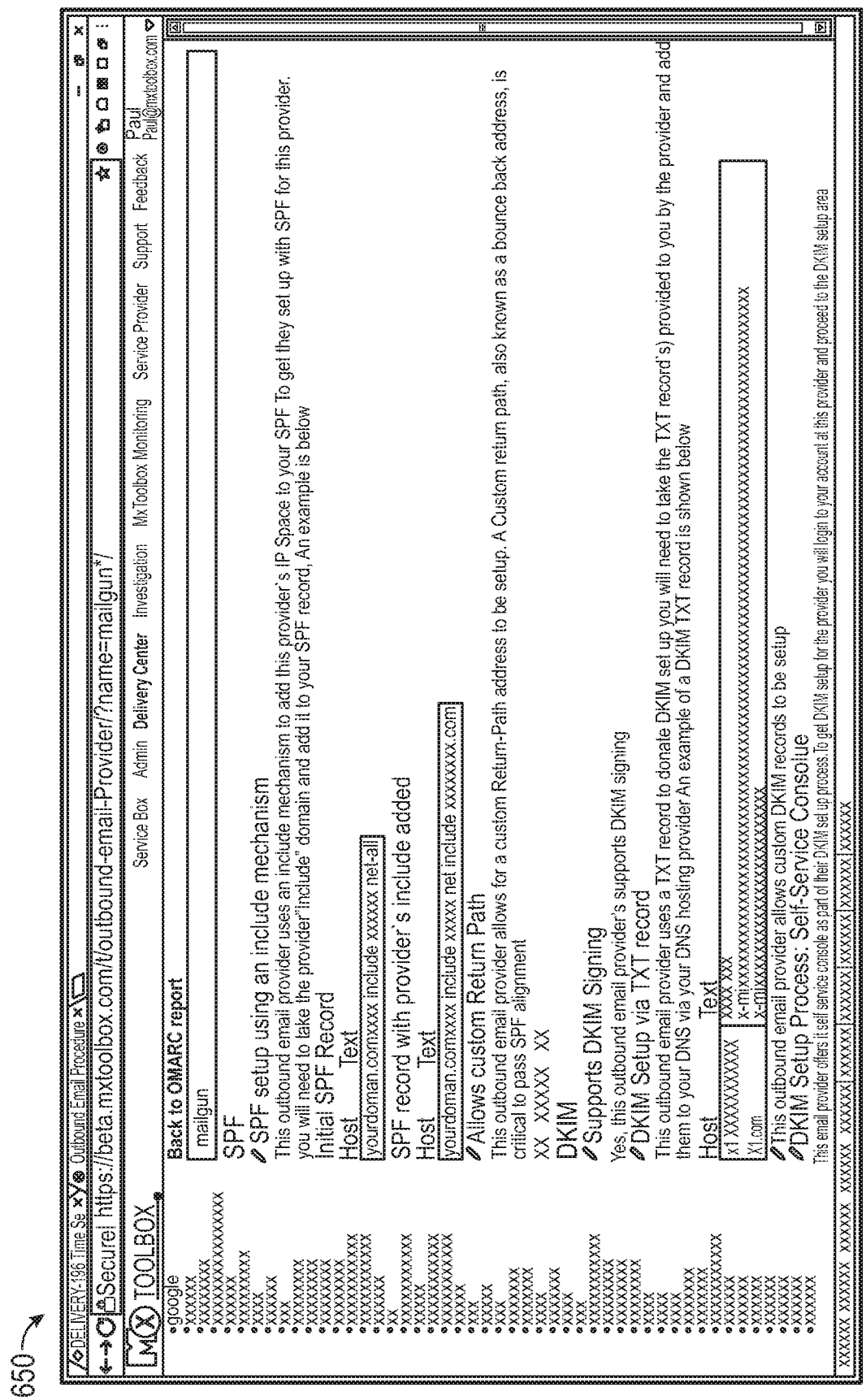
FIG. 7 is a flow chart for an exemplary method for mapping email source characteristics to documentation.

FIG. 7 is a step flow chart for an exemplary Outbound Email Source Characteristics Mapped to Documentation Collect OES Characteristics 610.

Store OES Characteristics 620.

Apply template to Data 630.

Display Templated Page in useful formatted page 640.
Exemplary display of mapped characteristics 650.
Improve OEP Template
BoilerPlate SPF/DKIM Provider Setup Content Customers looking to setup SPF/DKIM face difficulty with finding accurate and reliable information for Outbound Email Sources (OES) on how to setup and/or activate this functionality. OES all provide different levels and means of conveying information. Some have no documentation at all.

A single repository based on information gathered from OES sources 610 and first-hand technical experience copied, stored and presented in a templated format makes it easier for users to setup data.

1. Catalogue characteristics necessary for SPF/DKIM setup for discovered OES 620.
  A. SPF/DKIM support;
  B. DKIM via CNAME/TXT record;
  C. DKIM Setup Self Service/Automatic/By Request to Source;
  D. Custom DKIM Record Allowed;
  E. OES support link/setup instructions from provider;
  F. Allows Custom Bounce Back Address; and
  G. Custom Written Content for Provider.
2. Present to users in template format 630, 640

Figure 8:
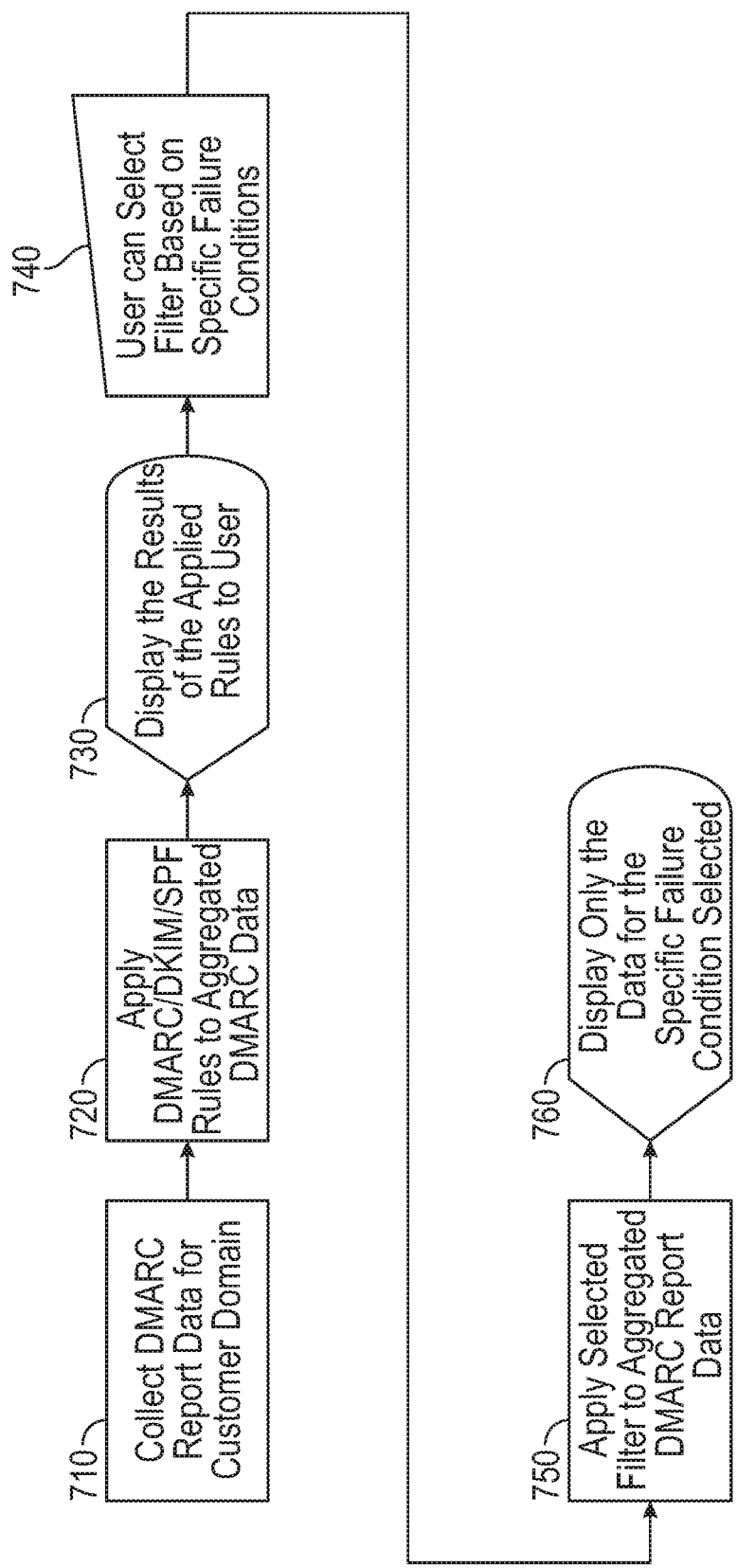
FIG. 8 is a flow chart of an exemplary rules engine to automatically identify issues.

FIG. 8 is a step flow chart for an exemplary Rules Engine to automatically identify issues.

Collect DMARC Report Data for Customer Domain 710;
Apply DMARC/DKIM/SPF rules to aggregated DMARC Data 720;
Display the results of the applied rules to user 730;
User can select filter based on specific failure conditions 740;
Apply selected filter to aggregated DMARC report data 750; and
Display only the Data for the specific failure condition selected 760.
Exemplary screen display 780.

The amount of data provided by aggregated DMARC reports is hard to understand even when displayed in a table. Users lack the expertise to ingest and make decisions based on aggregated DMARC data. They need assistance to recognize problems and what type of problems the aggregated data means.

1. Using a proprietary formula based on DKIM/SPF Authentication and Alignment and the domain's related DMARC/DKIM/SPF records identify issues affecting email delivery 710 including:
  A. Not DKIM/SPF Aligned;
  B. No SPF Record Published;
  C. Local Policy Rejection;
  D. SPF Neutral Result;
  E. SPF Hard Fail;
  F. SPF Soft Fail;
  G. DKIM/SPF Temp Error;
  H. DKIM/SPF Perm Error;
  I. DKIM Syntax Error;
  J. DKIM Domain Missing;
  K. No DKIM Signature Present;
  L. DKIM Signature Not Acceptable; and
  M. DKIM Failures 720.
2. Display detected issues to user 730.
3. Allow user to filter data by issue 740.
Apply selected filter to aggregated DMARC report data 750.
Display only the data for the specific failure condition selected 760.

Figure 9:
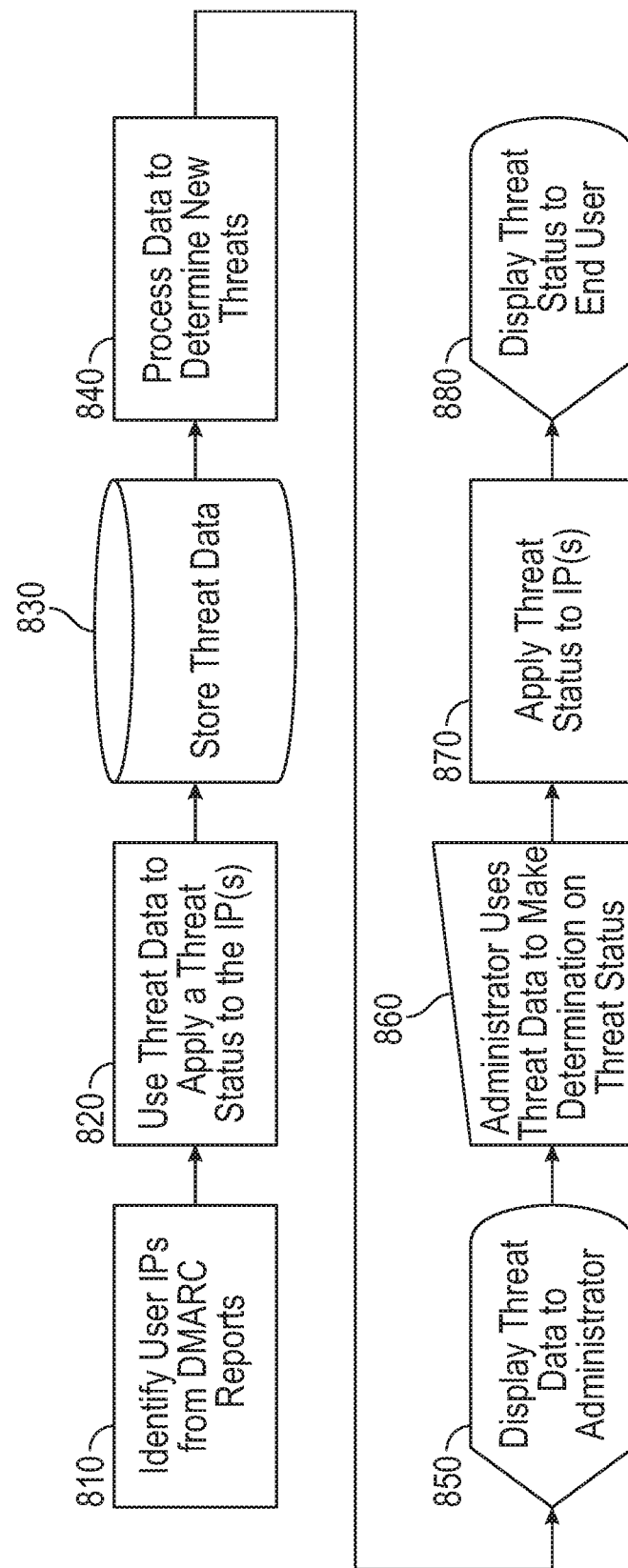
FIG. 9 is a flow chart of an exemplary method for overlaying threat data on top of DMARC report data and table.

FIG. 9 is a step flow chart for an exemplary method tool for overlaying threat data on top of DMARC report data.

Identify User IPs from DMARC Reports 810;
Use Threat Data to apply a threat status to the IP(s) 820;
Store threat data 830;
Process data to determine new threats 840;
Display threat data to administrator 850;
Administrator uses threat data to make determination on threat status 860;
Apply threat status to IP(s) 870; and
Display threat status to end user 880.
Exemplary display screen of threat status to end use 890.
Add Blacklist, Geo, Rep data to IP Address sub aggregates.

Users have many different ways of sending email and frequently use 3rd parties to do so. It is difficult to keep track of the IPs sending mail and it's not helpful to monitor the blacklist status of all of a provider's IP space. Even if a user is familiar with all of the ways they send email, it is still difficult to discern whether an IP appearing in a DMARC report is a threat.

1. Identify User's sending IPs 810.
2. Use proprietary threat data 820 including Blacklist Status, User Reports, Message Volume, Number of Domains which IP sends email, type of domains for which IP is sending email, Geolocation, ASN name, Reverse DNS Record and DMARC Failures to apply a threat status to IP(s).
3. Store threat data for IP 830
4. Administrator reviews threat data and makes determination 860.
5. Display threat status to user 880.
Process data to determine new threats 840.
Display threat data to administrator 850.

Figure 10:
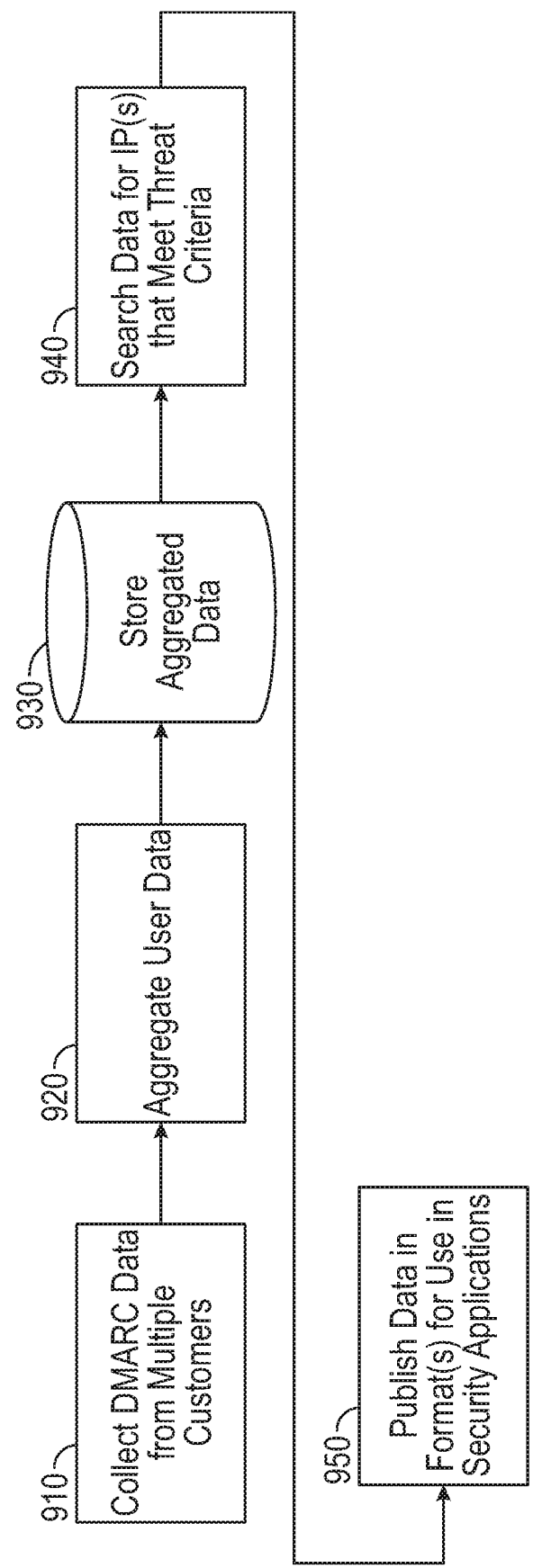
FIG. 10 is a flow chart for an exemplary method for extracting threat/abuse information from DMARC report data.

FIG. 10 is a step flow chart for Extracting Threat/abuse information from DMARC report data.

Collect DMARC Data from multiple customers 910;
Aggregate user data 920;
Store aggregated data 930;
Search Data for IP(s) that meet threat criteria 940; and
Publish Data in format(s) for use in security applications 950.

Active Threat Mitigation Spoofed Mail Sender Blacklist:
By looking at DKIM and SPF authentication failures across multiple customer domains, we can identify sending IP addresses known to be sending spoofed email. This would be useful in publishing as a blacklist for use in other security applications.

1. Collect DMARC Data from multiple customer 910.
2. Aggregate user data 920.
3. Check IP(s) sending for many domains, DMARC failures, SPF failures, DKIM failures, and Email Volume along with metadata such as ASN, Geolocation, and Reverse DNS 930, 940.
4. Publish data for use as blacklist or for use by other parties 950.

Figure 11:
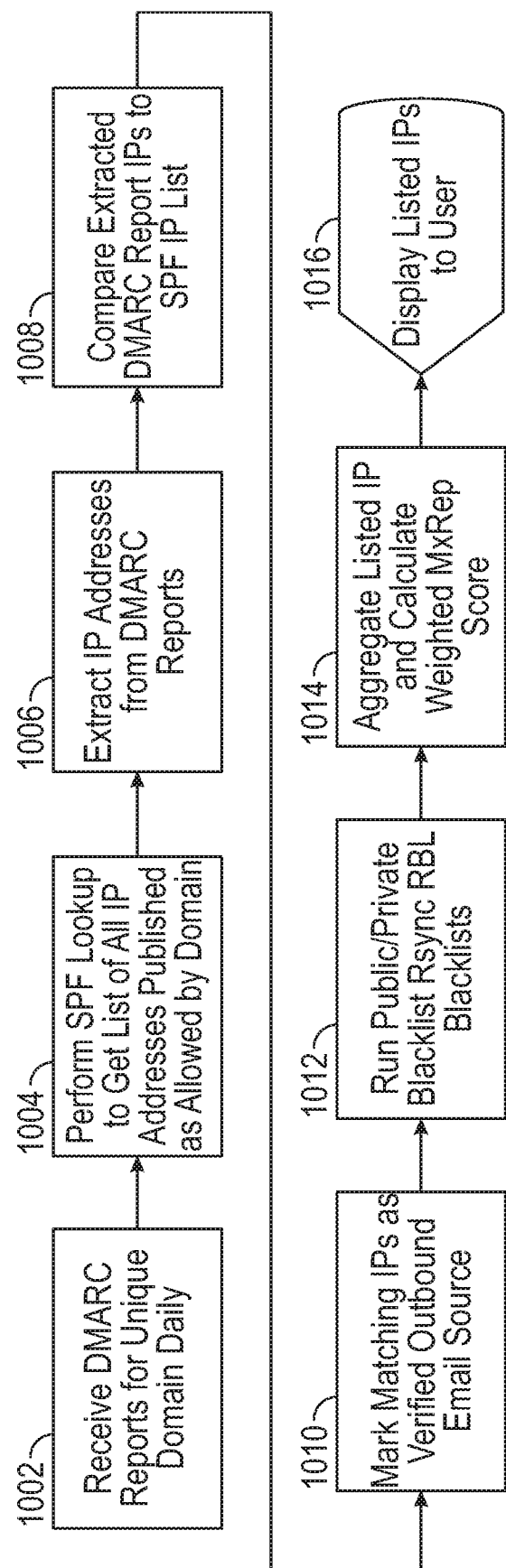
FIG. 11 is a flow chart for an exemplary method for adaptive black list monitoring.

FIG. 11 is a step flow chart for an example of Adaptive Blacklist Monitoring Receive DMARC reports for unique domain daily 1002;
Perform SPF Lookup to get list of all IP addresses published as allowed by domain 1004;
Extract IP Addresses from DMARC Reports 1006;
Compare extracted DMARC Report IPs to SPF IP List 1008; Mark matching IPs as verified outbound email source 1010;

Run public/private blacklist rsync RBL blacklists 1012;

Aggregate listed IP and calculate weighted Rep Score 1014; and

Display listed IPs to user 1016.

Blacklist Reputation Sources in 1 View.

Deliverability: Display Blacklist Operators on SPF Outbound.

Adaptive Blacklist Monitoring for verified IPs.

Adaptive Blacklist Details.

Tracking IP address reputation (REL/Blacklist) traditionally requires casting a large net across all internally and externally known outbound IP addresses. By monitoring daily IP address reported in DMARC Aggregate reports and then actively matching IP addresses found in those reports against IP addresses published in the same domain's SPF record, IP addresses used on a daily level can be reported.

Receive DMARC reports for a unique domain each day 1002.

Perform an SPF (DNS) lookup to get a list of all IP addresses published as allowed senders for the domain 1004.

Extract IP addresses 1006 from each report and compare against the SPF queried list 1008. If IP addresses match=Verified Source IP address and store in database 1010.

Perform an RBLDNSD (blacklist) lookup against publically available and private RBL blacklists 1012. If positive hit found (blacklisting), insert the RBL provider.

Aggregate all positive RBL hits per IP address and calculate a weighted Rep score on the overall impact 1014.

Daily list of IP Addresses that have sent email and are blacklisted are reported 1016.

Figure 12:
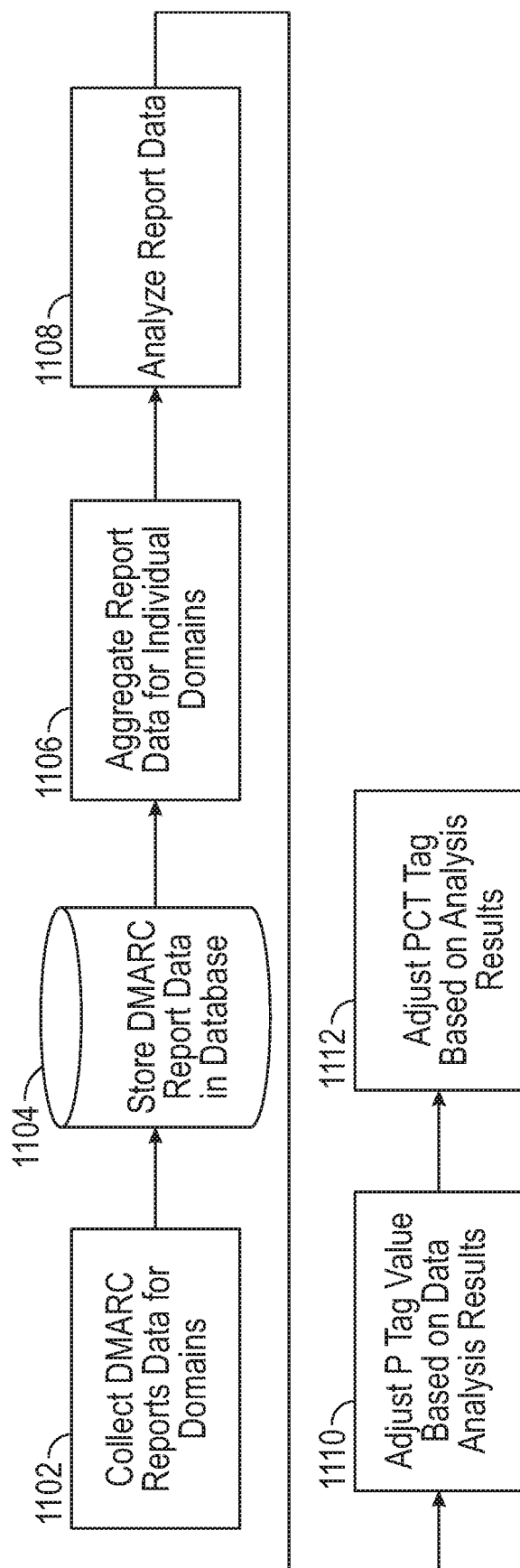
FIG. 12 is a flow chart for an exemplary method for scaling DMARC policy.

FIG. 12 is a step flow chart for an exemplary Method to scale DMARC Policy.

Collect DMARC report data for domains 1102;
Store DMARC report data in database 1104;
Aggregate Report Data for individual domains 1106;
Analyze Report Data 1108;
Adjust p tag value based on data analysis results 1110; and
Adjust pct tag based on analysis results 1112.
Slider for DMARC Policy:

1. Collect DMARC report data for domains 1102 and store in database 1104.

2. Aggregate Report Data for individual domains 1106.

3. Analyze user's report data 1108 for Email Volume, SPF Compliance, DKIM Compliance, and DMARC pass rate.

4. Automatically adjust or prompt user to adjust the p tag value between none, quarantine and reject based on predetermined values 1110.

5. Adjust the pct tag value based on predetermined values 1112.

Figure 13:
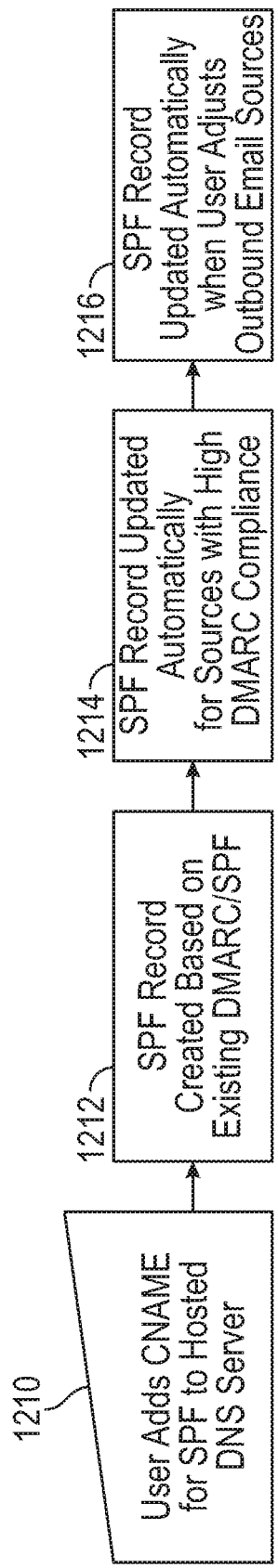
FIG. 13 is a flow chart for an exemplary method for auto-updating SPF record for providers.

FIG. 13 is a step flow chart for an exemplary method to auto-update SPF record for providers.

User adds CNAME for SPF to hosted DNS sever 1210;
SPF Record created based on existing DMARC/SPF 1212;
SPF Record updated automatically for sources with high DMARC Compliance 1214; and
SPF Record updated automatically when user adjusts Outbound Email Sources 1216.

1. User adds CNAME record for SPF to point to hosted DNS server 1210.

2. TXT Record for SPF created following RFC guidelines based on User's existing SPF record and any collected DMARC Data 1212.

3. SPF Record automatically updated for sources that have high DMARC compliance, but are not included in SPF record 1214.

4. Users can make a change to classify a source as verified (as a sending source of email) or remove a source as verified and the SPF record is automatically updated 1216.

Figure 14:
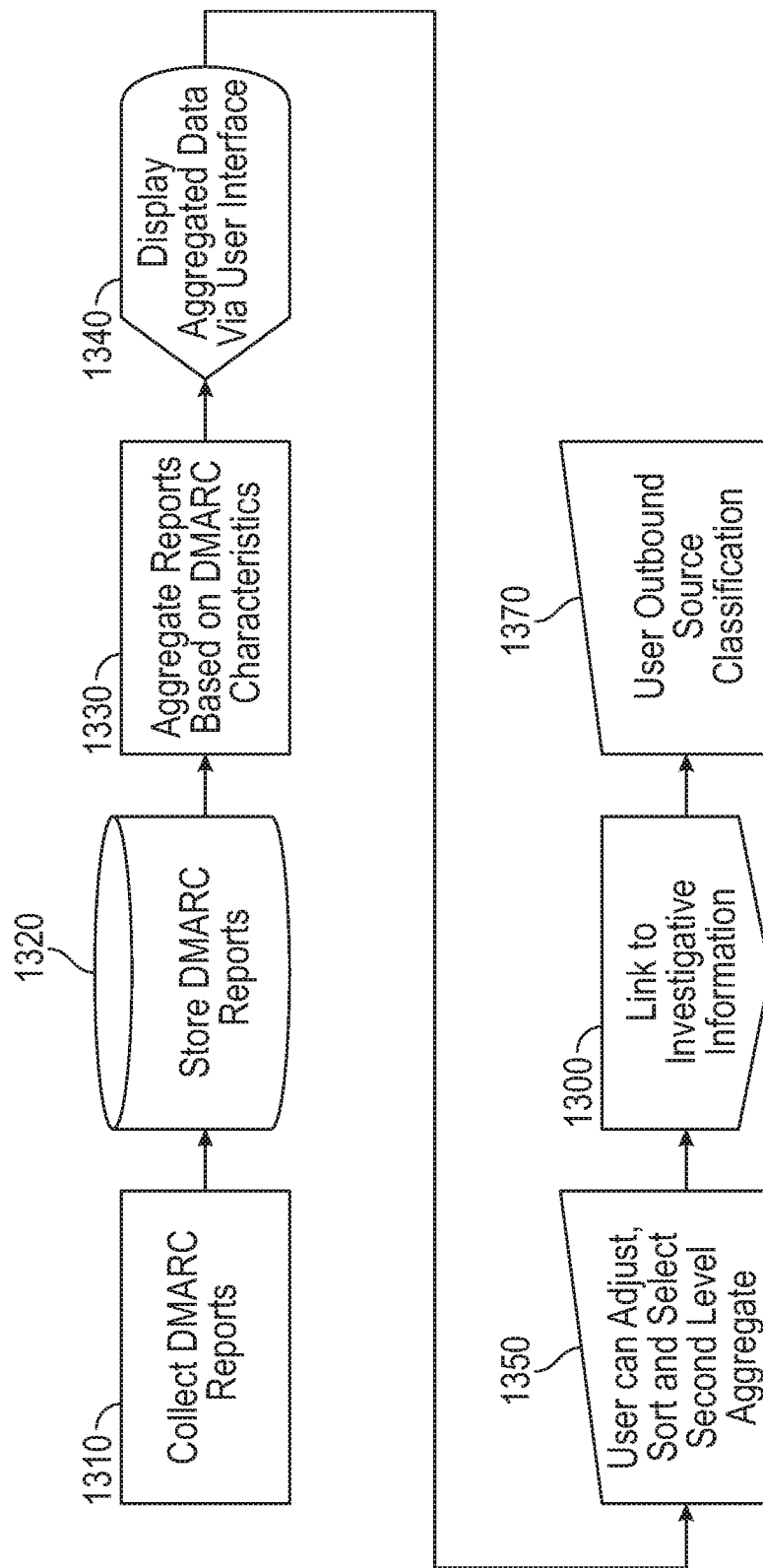
FIG. 14 is a flow chart for and exemplary user tool to associate, investigate and classify outbound provider data.

FIG. 14 is a step flow chart for a User Tool to associate, investigate and classify outbound provider data; and an exemplary user interface display of same.

Collect DMARC Reports 1310;
Store DMARC Reports 1320;
Aggregate Reports based on DMARC characteristics 1330;
Display aggregated data via User Interface 1340;
Users can adjust, sort and select second level aggregate 1350;
Link to Investigative Information 1360; and
User Outbound Source Classification 1370.

Outbound Providers are associated with subscribed DMARC domains.

Threat Investigator tool:
DMARC Email Source Classification UI.
Architect: IP Address Data (ASN, Geo, Outbound Provider) RDS or
Serverless Microarchitecture.

While the various association databases linking source IP addresses to outbound providers and other classifiers are built automatically, they must be manually audited and curated to achieve high quality. Tools are needed to efficiently verify and correct associations, and to store associations which cannot be automatically discovered.

Collect DMARC records 1310 and store in database 1320

Allow users to query data on various characteristics embedded in the DMARC reports, aggregated over a custom time period 1330. For example:

Inbox Provide;
Outbound Email Provider;
Sender's IP;
Sender's ASN;
SPF Domains;
DKIM Domains;
Header's From Domains;
SPF Auth Results; and
DKIM Auth Results.

The user can then query a database for a given value (e.g., Outbound Email Provider="Unknown"), and select a second level aggregate from the same list of characteristics above (a . . . i) 1350.

Display aggregated data via User Interface 1340

The user can follow a link to view investigative information 1360 associated with an IP address or domain name of interest to help them further classify the data with relevant data to assist with classification including:

Time Series Chart for aggregate Threats and Unknown;
PTR, ASN, ASNAME, GEO, BLACKLIST;
Integrated Forensic Sample Messages; and
Related Domains.

The user can then suggest a classification for the data 1370, for example:

Verified Source;
Forwarder;
Threat; and
Unknown.

Publishing Threat Data as a Real-time Block List.
Active Threat Mitigation Spoofed Mail Sender Blacklist
Method to Automatically Modify DMARC Policy based on DMARC
Compliance of Legitimate Email.

Collect DMARC report data for domain and store in database.

Track DMARC Compliance of Verified Message Volume for domain with Quarantine or Reject Policy.

Percentage Value may or may not be present.

Based on internal scoring chart based (DMARC Compliance of Verified Source Email Volume).

Based on scoring automatically adjust DMARC Policy Value and DMARC Percentage Value.

The present invention further contemplates one or more methods for collecting, processing, aggregating, displaying, and triggering or signaling actions for DMARC report data to improve the way computers operate with respect to email. The steps of such methods include:

(a) providing a DMARC report ingestion means to collect and process DMARC reports;

(b) providing a database schema to store aggregated data from DMARC reports for a domain;

(c) providing a user interface that allows for end users to understand DMARC report data;

(d) providing administration ability to review and manage Outbound Email Sources;

(e) providing a means to automatically adjust DMARC and SPF records based on DMARC data; and (f) providing a means to elicit and generate threat sources and signatures.

In addition to the foregoing embodiments, the present disclosure provides programs stored on non-transient machine readable medium to operate computers and devices according to the principles of the present disclosure. Machine readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate in the foregoing exemplary types of machine-readable media, and any combinations thereof. The programs and applications stored on the machine-readable media in turn include one or more machine executable instructions which are read by the various devices and executed. Each of these instructions causes the executing device to perform the functions coded or otherwise documented in it. Of course, the programs can take many different forms such as applications, operating systems, Perl scripts, JAVA applets, C programs, compilable (or compiled) programs, interpretable (or interpreted) programs, natural language programs, assembly language programs, higher order programs, embedded programs, and many other existing and future forms which provide similar functionality as the foregoing examples, and any combinations thereof.

Many modifications and other embodiments of the invention described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
receiving, at a computing device comprising a processor and memory, message reporting data, wherein the message reporting data includes source addresses associated with email messages received by at least one receiving organization, each source address specifying a sender of a selected one of the email messages;
identifying, in the computer, outbound providers associated with the source addresses;
classifying, in the computer, the source addresses based on the identified outbound providers;
aggregating, in the computer, the source addresses based on the classification; and
generating, in the computer, a report including the aggregated source addresses.

2. The method of claim 1, wherein identifying the outbound providers comprises matching the sources addresses to entries in an outbound provider database.

3. The method of claim 1, wherein classifying the source addresses comprises:
assigning a first subset of the source addresses matching entries of verified senders in the outbound provider database a verified sender classification; and
assigning a second subset of the source addresses not matching entries in the outbound provider database a classification of unknown.

4. The method of claim 3, wherein classifying the source addresses comprises:
assigning a third subset of the source addresses matching entries of forwarders in the outbound provider database a classification of forwarder; and
assigning a fourth subset of the source addresses a classification of threat.

5. The method of claim 3, comprising:
designating a portion of the second subset of the source addresses as being associated with a new outbound service provider; and
adding an entry to the outbound provider database for the new outbound service provider.

6. The method of claim 5, comprising:
associating source documentation with the entry for the new outbound service provider.

7. The method of claim 6, wherein the source documentation comprises email capabilities of the new outbound service provider.

8. The method of claim 5, comprising assigning the new outbound service provider an identifier of one or more of verified sender, forwarder, threat, or unknown.

9. The method of claim 1, comprising:
receiving Sender Policy Framework (SPF) data defining source addresses associated with a selected outbound provider; and
storing an entry in the outbound provider database for the selected outbound provider based on the SPF data.

10. The method of claim 9, comprising:
storing the entry in the outbound provider database for the selected outbound provider based on at least one of Autonomous System Number (ASN) data associating the source addresses to the selected outbound provider, Domain Name Service (DNS) data, or GeoLocation data.

11. The method of claim 1, wherein the message reporting data comprises Domain-based Message Authentication Reporting and Conformance (DMARC) data.

12. The method of claim 1, comprising:
receiving, at the computing device, message reporting data, wherein the message reporting data includes source addresses associated with email messages received by a plurality of receiving organizations.

13. A system for processing message reporting data, comprising:
a computer comprising a processor and memory, wherein the computer is configured to:
receive message reporting data, wherein the message reporting data includes source addresses associated with email messages received by at least one receiving organization, each source address specifying a sender of a selected one of the email messages;
identify outbound providers associated with the source addresses;
classify the source addresses based on the identified outbound providers;
aggregate the source addresses based on the classification; and
generate a report including the aggregated source addresses.

14. The system of claim 13, wherein the computer is configured to identify the outbound providers by:
matching the sources addresses to entries in an outbound provider database.

15. The system of claim 13, wherein the computer is configured to classify the source addresses by:
assigning a first subset of the source addresses matching entries of verified senders in the outbound provider database a verified sender classification; and
assigning a second subset of the source addresses not matching entries in the outbound provider database a classification of unknown.

16. The system of claim 13, wherein the computer is configured to classify the source addresses by:
assigning a third subset of the source addresses matching entries of forwarders in the outbound provider database a classification of forwarder; and
assigning a fourth subset of the source addresses a classification of threat.

17. The system of claim 15, wherein the computer is configured to:
designate a portion of the second subset of the source addresses as being associated with a new outbound service provider; and
add an entry to the outbound provider database for the new outbound service provider.

18. The system of claim 17, wherein the computer is configured to:
associate source documentation with the entry for the new outbound service provider.

19. The system of claim 13, wherein the computer is configured to:
receive Sender Policy Framework (SPF) data defining source addresses associated with a selected outbound provider; and
store an entry in the outbound provider database for the selected outbound provider based on the SPF data.

20. A non-transitory computer-readable memory device with instructions stored thereon for processing message reporting data, the instructions, when executed, are configured to cause one or more computers to perform actions comprising:
receiving message reporting data, wherein the message reporting data includes source addresses associated with email messages received by at least one receiving organization, each source address specifying a sender of a selected one of the email messages;
identifying outbound providers associated with the source addresses;
classifying the source addresses based on the identified outbound providers;
aggregating the source addresses based on the classification; and
generating a report including the aggregated source addresses.

* * * * *